(12) United States Patent
Dentzer

(10) Patent No.: US 11,449,198 B2
(45) Date of Patent: Sep. 20, 2022

(54) USER INTERFACE SUPPORT FOR LARGE HIERARCHIES

(71) Applicant: SAP SE, Walldorf (DE)

(72) Inventor: Ralf Dentzer, Hockenheim (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/872,027

(22) Filed: May 11, 2020

(65) Prior Publication Data

US 2021/0349580 A1    Nov. 11, 2021

(51) Int. Cl.
*G06F 3/0482* (2013.01)
*G06F 3/0485* (2022.01)
*G06F 16/22* (2019.01)
*G06F 9/451* (2018.01)

(52) U.S. Cl.
CPC .......... *G06F 3/0482* (2013.01); *G06F 3/0485* (2013.01); *G06F 9/451* (2018.02); *G06F 16/2246* (2019.01)

(58) Field of Classification Search
CPC .... G06F 3/0482; G06F 9/451; G06F 16/2246; G06F 3/0485
See application file for complete search history.

(56) References Cited

U.S. PATENT DOCUMENTS

| | | | | |
|---|---|---|---|---|
| 6,072,492 A * | 6/2000 | Schagen | ............... | G06F 16/904 709/219 |
| 6,073,137 A * | 6/2000 | Brown | ..................... | G06F 9/451 |
| 6,199,098 B1 * | 3/2001 | Jones | .................. | G06F 16/9558 709/203 |
| 6,279,007 B1 * | 8/2001 | Uppala | ............... | G06F 16/9027 |
| 6,314,424 B1 * | 11/2001 | Kaczmarski | ........ | G06F 16/9577 |
| 6,496,842 B1 * | 12/2002 | Lyness | .................. | G06F 3/0482 715/206 |
| 6,738,970 B1 * | 5/2004 | Kruger | ...................... | G06F 8/60 717/169 |
| 6,961,909 B2 * | 11/2005 | Lord | ....................... | H04L 29/06 715/853 |
| 7,203,701 B1 * | 4/2007 | Packebush | .......... | G06F 16/9027 |
| 7,353,464 B1 * | 4/2008 | Kundu | ............... | G06F 16/2423 715/853 |
| 7,873,636 B2 * | 1/2011 | Brown | .................. | G06F 16/958 707/736 |
| 8,280,783 B1 * | 10/2012 | Brownell | ............... | G06Q 30/00 705/27.1 |

(Continued)

FOREIGN PATENT DOCUMENTS

WO    WO 2014/130580    8/2014

OTHER PUBLICATIONS

SAP HANA Hierarchy Developer Guide, Document Version 1.1, Oct. 31, 2019, 100 pages.

*Primary Examiner* — Shen Shiau
(74) *Attorney, Agent, or Firm* — Klarquist Sparkman, LLP

(57) ABSTRACT

A visual depiction of a hierarchy stored at a server computer can be presented at a client computer that interacts with the server computer as operations are performed on the hierarchy. Efficient execution of operations and determination of which nodes are visible within the hierarchy can be supported without sending the entire hierarchy back and forth between the client and the server. Drill state in the user interface can be preserved during operations. The server can support multiple clients interacting with the hierarchy at the same time.

17 Claims, 20 Drawing Sheets

(56) References Cited

U.S. PATENT DOCUMENTS

| | | | |
|---|---|---|---|
| 8,713,056 B1* | 4/2014 | Wongkar | H04L 63/0281 |
| | | | 707/786 |
| 8,972,900 B2* | 3/2015 | Rotshtein | G06F 16/838 |
| | | | 715/741 |
| 9,424,026 B2 | 8/2016 | Atanasiu et al. | |
| 9,727,209 B2* | 8/2017 | Wang | G06F 3/0482 |
| 10,353,980 B2 | 7/2019 | Hochreuter et al. | |
| 2002/0143864 A1* | 10/2002 | Page | G06F 16/954 |
| | | | 709/203 |
| 2002/0156814 A1* | 10/2002 | Ho | G06F 9/541 |
| | | | 715/205 |
| 2003/0063134 A1* | 4/2003 | Lord | H04L 67/34 |
| | | | 715/853 |
| 2004/0068521 A1* | 4/2004 | Haacke | G06F 16/957 |
| 2004/0243616 A1* | 12/2004 | Benhase | G06F 16/168 |
| 2005/0091252 A1* | 4/2005 | Liebich | G06F 3/0482 |
| 2006/0136526 A1* | 6/2006 | Childress | G06F 11/1451 |
| 2007/0110047 A1* | 5/2007 | Kim | G06F 16/954 |
| | | | 370/389 |
| 2007/0156427 A1 | 7/2007 | Dentzer et al. | |
| 2007/0162468 A1 | 7/2007 | Dentzer et al. | |
| 2007/0239733 A1* | 10/2007 | Tanzy | G06F 16/958 |
| 2008/0282189 A1* | 11/2008 | Hofmann | G06F 40/106 |
| | | | 715/793 |
| 2010/0067113 A1* | 3/2010 | Harrison | G06F 16/9027 |
| | | | 359/555 |
| 2010/0250505 A1 | 9/2010 | Dentzer | |
| 2010/0250506 A1 | 9/2010 | Dentzer | |
| 2010/0332277 A1 | 12/2010 | Dentzer et al. | |
| 2010/0332495 A1 | 12/2010 | Richter et al. | |
| 2011/0051623 A1* | 3/2011 | Johnson | H04L 67/1097 |
| | | | 370/254 |
| 2012/0030223 A1 | 2/2012 | Stein et al. | |
| 2012/0047144 A1* | 2/2012 | Huitema | G06F 16/248 |
| | | | 707/740 |
| 2012/0072872 A1* | 3/2012 | Mahr | G06F 9/451 |
| | | | 715/854 |
| 2012/0174081 A1 | 7/2012 | Thimmel et al. | |
| 2013/0024472 A1 | 1/2013 | Stein et al. | |
| 2013/0132911 A1* | 5/2013 | Rotshtein | G06F 16/838 |
| | | | 715/854 |
| 2014/0085307 A1* | 3/2014 | Lei | G06F 16/26 |
| | | | 345/440 |
| 2015/0242079 A1* | 8/2015 | Vernia | H04L 41/22 |
| | | | 715/855 |
| 2016/0092048 A1* | 3/2016 | van den Broek | G06F 3/0481 |
| | | | 715/825 |
| 2018/0004851 A1 | 1/2018 | Zarins et al. | |
| 2018/0081904 A1* | 3/2018 | Cosby | G06F 16/287 |
| 2018/0173771 A1 | 6/2018 | Dentzer et al. | |
| 2018/0293586 A1 | 10/2018 | Doan et al. | |
| 2019/0025991 A1* | 1/2019 | Bonchev | G06F 3/0605 |

\* cited by examiner

FIG. 4

| RETRIEVED HIERARCHY SECTION 400 | | | | | | | |
|---|---|---|---|---|---|---|---|
| DISPLAY NAME 420A | DRILLSTATE 421A | LEVEL 422A | NODE ID 423A | PARENT ID 425A | POS. INFO. 427A | PRANK INFO. 429A | |
| DISPLAY NAME 420B | DRILLSTATE 421B | LEVEL 422B | NODE ID 423B | PARENT ID 425B | POS. INFO. 427B | PRANK INFO. 429B | |
| ... | | | | | | | |
| DISPLAY NAME 420N | DRILLSTATE 421N | LEVEL 422N | NODE ID 423N | PARENT ID 425N | POS. INFO. 427N | PRANK INFO. 429N | |

420

700

| NODE TEXT | D | LV | NODE ID | PARENT ID | TS | R | PR |
|---|---|---|---|---|---|---|---|
| v ROOT NODE 01 | E | 1 | 8,00000001;8,0000001 | 8,00000001;8,0000000 | 85 | 1 | 0 |
| v INNER NODE 02 | E | 2 | 8,00000001;8,0000002 | 8,00000001;8,0000001 | 21 | 2 | 1 |
| > INNER NODE 03 | C | 3 | 8,00000001;8,0000003 | 8,00000001;8,0000002 | 5 | 3 | 2 |
| v INNER NODE 08 | E | 3 | 8,00000001;8,0000008 | 8,00000001;8,0000008 | 5 | 8 | 2 |
| MASTER DATA 05 | L | 4 | 8,00000001;8,0000009 | 8,00000001;8,0000008 | 1 | 9 | 8 |
| MASTER DATA 06 | L | 4 | 8,00000001;8,0000010 | 8,00000001;8,0000008 | 1 | 10 | 8 |
| MASTER DATA 07 | L | 4 | 8,00000001;8,0000011 | 8,00000001;8,0000008 | 1 | 11 | 8 |
| MASTER DATA 08 | L | 4 | 8,00000001;8,0000012 | 8,00000001;8,0000008 | 1 | 12 | 8 |
| > INNER NODE 13 | C | 3 | 8,00000001;8,0000013 | 8,00000001;8,0000002 | 5 | 13 | 2 |
| > INNER NODE 18 | C | 3 | 8,00000001;8,0000018 | 8,00000001;8,0000002 | 5 | 18 | 2 |
| > INNER NODE 23 | C | 2 | 8,00000001;8,0000023 | 8,00000001;8,0000001 | 21 | 23 | 1 |
| > INNER NODE 44 | C | 2 | 8,00000001;8,0000044 | 8,00000001;8,0000001 | 21 | 44 | 1 |
| v INNER NODE 65 | E | 2 | 8,00000001;8,0000065 | 8,00000001;8,0000001 | 21 | 65 | 1 |
| > INNER NODE 66 | C | 3 | 8,00000001;8,0000066 | 8,00000001;8,0000065 | 5 | 66 | 65 |
| > INNER NODE 71 | C | 3 | 8,00000001;8,0000071 | 8,00000001;8,0000065 | 5 | 71 | 65 |
| > INNER NODE 76 | C | 3 | 8,00000001;8,0000076 | 8,00000001;8,0000065 | 5 | 76 | 65 |
| v INNER NODE 81 | E | 3 | 8,00000001;8,0000081 | 8,00000001;8,0000065 | 5 | 81 | 65 |
| MASTER DATA 61 | L | 4 | 8,00000001;8,0000082 | 8,00000001;8,0000081 | 1 | 82 | 81 |
| MASTER DATA 62 | L | 4 | 8,00000001;8,0000083 | 8,00000001;8,0000081 | 1 | 83 | 81 |
| MASTER DATA 63 | L | 4 | 8,00000001;8,0000084 | 8,00000001;8,0000081 | 1 | 84 | 81 |

| NODE TEXT | D | LV | NODE ID | PARENT ID | TS | R | PR |
|---|---|---|---|---|---|---|---|
| v ROOT NODE 01 | E | 1 | 8,00000001;8,0000001 | 8,00000001;8,0000000 | 85 | 1 | 0 |
| v INNER NODE 02 | E | 2 | 8,00000001;8,0000002 | 8,00000001;8,0000001 | 21 | 2 | 1 |
| v INNER NODE 08 | E | 3 | 8,00000001;8,0000008 | 8,00000001;8,0000008 | 5 | 8 | 2 |
| MASTER DATA 06 | L | 4 | 8,00000001;8,0000010 | 8,00000001;8,0000008 | 1 | 10 | 8 |
| > INNER NODE 18 | C | 3 | 8,00000001;8,0000018 | 8,00000001;8,0000002 | 5 | 18 | 2 |
| > INNER NODE 23 | C | 2 | 8,00000001;8,0000023 | 8,00000001;8,0000001 | 21 | 23 | 1 |
| > INNER NODE 44 | C | 2 | 8,00000001;8,0000044 | 8,00000001;8,0000001 | 21 | 44 | 1 |
| v INNER NODE 65 | E | 2 | 8,00000001;8,0000065 | 8,00000001;8,0000001 | 21 | 65 | 1 |
| > INNER NODE 66 | C | 3 | 8,00000001;8,0000066 | 8,00000001;8,0000065 | 5 | 66 | 65 |
| > INNER NODE 71 | C | 3 | 8,00000001;8,0000071 | 8,00000001;8,0000065 | 5 | 71 | 65 |
| > INNER NODE 76 | C | 3 | 8,00000001;8,0000076 | 8,00000001;8,0000065 | 5 | 76 | 65 |
| v INNER NODE 81 | E | 3 | 8,00000001;8,0000081 | 8,00000001;8,0000065 | 5 | 81 | 65 |
| MASTER DATA 61 | L | 4 | 8,00000001;8,0000082 | 8,00000001;8,0000081 | 1 | 82 | 81 |
| MASTER DATA 62 | L | 4 | 8,00000001;8,0000083 | 8,00000001;8,0000081 | 1 | 83 | 81 |
| MASTER DATA 63 | L | 4 | 8,00000001;8,0000084 | 8,00000001;8,0000081 | 1 | 84 | 81 |
| MASTER DATA 64 | L | 4 | 8,00000001;8,0000085 | 8,00000001;8,0000081 | 1 | 85 | 81 |

| NODE TEXT | D | LV | NODE ID | PARENT ID | TS |
|---|---|---|---|---|---|
| v ROOT NODE 01 | E | 1 | 8,01;8,01 | 8,01;8,00 | 85 |
|   v INNER NODE 02 | E | 2 | 8,01;8,02 | 8,01;8,01 | 21 |
|     v INNER NODE 03 | E | 3 | 8,01;8,03 | 8,01;8,02 | 5 |
|       MASTER DATA 01 | L | 4 | 8,01;8,04 | 8,01;8,03 | 1 |
|       MASTER DATA 02 | L | 4 | 8,01;8,05 | 8,01;8,03 | 1 |
|       MASTER DATA 03 | L | 4 | 8,01;8,06 | 8,01;8,03 | 1 |
|       MASTER DATA 04 | L | 4 | 8,01;8,07 | 8,01;8,03 | 1 |
|     v INNER NODE 08 | E | 3 | 8,01;8,08 | 8,01;8,02 | 5 |
|       MASTER DATA 05 | L | 4 | 8,01;8,09 | 8,01;8,08 | 1 |
|       MASTER DATA 06 | L | 4 | 8,01;8,10 | 8,01;8,08 | 1 |
|       MASTER DATA 07 | L | 4 | 8,01;8,11 | 8,01;8,08 | 1 |
|       MASTER DATA 08 | L | 4 | 8,01;8,12 | 8,01;8,08 | 1 |
|     > INNER NODE 13 | C | 3 | 8,01;8,13 | 8,01;8,02 | 5 |
|     > INNER NODE 18 | C | 3 | 8,01;8,18 | 8,01;8,02 | 5 |
|   v INNER NODE 23 | E | 2 | 8,01;8,23 | 8,01;8,01 | 21 |
|     > INNER NODE 24 | C | 3 | 8,01;8,24 | 8,01;8,23 | 5 |
|     > INNER NODE 29 | C | 3 | 8,01;8,29 | 8,01;8,23 | 5 |
|     > INNER NODE 34 | C | 3 | 8,01;8,34 | 8,01;8,23 | 5 |
|     > INNER NODE 39 | C | 3 | 8,01;8,39 | 8,01;8,23 | 5 |
| v INNER NODE 44 | E | 2 | 8,01;8,44 | 8,01;8,01 | 21 |

| NODE TEXT | D | LV | NODE ID | PARENT ID | TS |
|---|---|---|---|---|---|
| v ROOT NODE 01 | E | 1 | 8,01;8,01 | 8,01;8,00 | 85 |
| v INNER NODE 02 | E | 2 | 8,01;8,02 | 8,01;8,01 | 21 |
| v INNER NODE 03 | E | 3 | 8,01;8,03 | 8,01;8,02 | 5 |
| MASTER DATA 01 | L | 4 | 8,01;8,04 | 8,01;8,03 | 1 |
| MASTER DATA 02 | L | 4 | 8,01;8,05 | 8,01;8,03 | 1 |
| MASTER DATA 03 | L | 4 | 8,01;8,06 | 8,01;8,03 | 1 |
| MASTER DATA 04 | L | 4 | 8,01;8,07 | 8,01;8,03 | 1 |
| MASTER DATA 05 | L | 4 | 8,01;8,09 | 8,01;8,03 | 1 |
| v INNER NODE 08 | E | 3 | 8,01;8,08 | 8,01;8,02 | 5 |
| MASTER DATA 06 | L | 4 | 8,01;8,10 | 8,01;8,08 | 1 |
| MASTER DATA 07 | L | 4 | 8,01;8,11 | 8,01;8,08 | 1 |
| MASTER DATA 08 | L | 4 | 8,01;8,12 | 8,01;8,08 | 1 |
| v INNER NODE 13 | C | 3 | 8,01;8,13 | 8,01;8,02 | 5 |
| MASTER DATA 09 | L | 4 | 8,01;8,14 | 8,01;8,13 | 1 |
| MASTER DATA 10 | L | 4 | 8,01;8,15 | 8,01;8,13 | 1 |
| MASTER DATA 11 | L | 4 | 8,01;8,16 | 8,01;8,13 | 1 |
| MASTER DATA 12 | L | 4 | 8,01;8,17 | 8,01;8,13 | 1 |
| > INNER NODE 18 | C | 3 | 8,01;8,18 | 8,01;8,02 | 5 |
| v INNER NODE 23 | E | 2 | 8,01;8,23 | 8,01;8,01 | 21 |
| > INNER NODE 24 | C | 3 | 8,01;8,24 | 8,01;8,23 | 5 |

| NODE TEXT | D | LV | NODE ID | PARENT ID | TS |
|---|---|---|---|---|---|
| v ROOT NODE 01 | E | 1 | 8,01;8,01 | 8,01;8,00 | 85 |
|   v INNER NODE 02 | E | 2 | 8,01;8,02 | 8,01;8,01 | 21 |
|     v INNER NODE 03 | E | 3 | 8,01;8,03 | 8,01;8,02 | 5 |
|       MASTER DATA 01 | L | 4 | 8,01;8,04 | 8,01;8,03 | 1 |
|       MASTER DATA 02 | L | 4 | 8,01;8,05 | 8,01;8,03 | 1 |
|       MASTER DATA 03 | L | 4 | 8,01;8,06 | 8,01;8,03 | 1 |
|       MASTER DATA 04 | L | 4 | 8,01;8,07 | 8,01;8,03 | 1 |
|       MASTER DATA 05 | L | 4 | 8,01;8,09 | 8,01;8,03 | 1 |
|     v INNER NODE 08 | E | 3 | 8,01;8,08 | 8,01;8,02 | 5 |
|       MASTER DATA 06 | L | 4 | 8,01;8,10 | 8,01;8,08 | 1 |
|       MASTER DATA 07 | L | 4 | 8,01;8,11 | 8,01;8,08 | 1 |
|       MASTER DATA 08 | L | 4 | 8,01;8,12 | 8,01;8,08 | 1 |
|     v INNER NODE 13 | C | 3 | 8,01;8,13 | 8,01;8,02 | 5 |
|       MASTER DATA 09 | L | 4 | 8,01;8,14 | 8,01;8,13 | 1 |
|       MASTER DATA 10 | L | 4 | 8,01;8,15 | 8,01;8,13 | 1 |
|       MASTER DATA 11 | L | 4 | 8,01;8,16 | 8,01;8,13 | 1 |
|       MASTER DATA 12 | L | 4 | 8,01;8,17 | 8,01;8,13 | 1 |
|     v INNER NODE 18 | C | 3 | 8,01;8,18 | 8,01;8,02 | 5 |
|       MASTER DATA 13 | L | 2 | 8,01;8,19 | 8,01;8,18 | 1 |
|       MASTER DATA 14 | L | 3 | 8,01;8,20 | 8,01;8,18 | 1 |

| NODE TEXT | D | LV | NODE ID | PARENT ID | TS |
|---|---|---|---|---|---|
| MASTER DATA 14 | L | 4 | 8,01;8,20 | 8,01;8,18 | 1 |
| MASTER DATA 15 | L | 4 | 8,01;8,21 | 8,01;8,18 | 1 |
| MASTER DATA 16 | L | 4 | 8,01;8,22 | 8,01;8,18 | 1 |
| v INNER NODE 23 | C | 2 | 8,01;8,23 | 8,01;8,01 | 21 |
| v INNER NODE 44 | C | 2 | 8,01;8,44 | 8,01;8,01 | 21 |
| v INNER NODE 65 | C | 2 | 8,01;8,65 | 8,01;8,01 | 21 |

| NODE TEXT | D | LV | NODE ID | PARENT ID | TS |
|---|---|---|---|---|---|
| MASTER DATA 14 | L | 4 | 8,01;8,20 | 8,01;8,18 | 1 |
| MASTER DATA 15 | L | 4 | 8,01;8,21 | 8,01;8,18 | 1 |
| MASTER DATA 16 | L | 4 | 8,01;8,22 | 8,01;8,18 | 1 |
| v INNER NODE 23 | E | 2 | 8,01;8,23 | 8,01;8,01 | 21 |
| v INNER NODE 24 | E | 3 | 8,01;8,24 | 8,01;8,23 | 5 |
| MASTER DATA 17 | L | 4 | 8,01;8,25 | 8,01;8,24 | 1 |
| MASTER DATA 18 | L | 4 | 8,01;8,26 | 8,01;8,24 | 1 |
| MASTER DATA 19 | L | 4 | 8,01;8,27 | 8,01;8,24 | 1 |
| MASTER DATA 20 | L | 4 | 8,01;8,28 | 8,01;8,24 | 1 |
| v INNER NODE 29 | E | 3 | 8,01;8,29 | 8,01;8,23 | 5 |
| MASTER DATA 21 | L | 4 | 8,01;8,30 | 8,01;8,29 | 1 |
| MASTER DATA 22 | L | 4 | 8,01;8,31 | 8,01;8,29 | 1 |
| MASTER DATA 23 | L | 4 | 8,01;8,32 | 8,01;8,29 | 1 |
| MASTER DATA 24 | L | 4 | 8,01;8,33 | 8,01;8,29 | 1 |
| v INNER NODE 34 | E | 3 | 8,01;8,34 | 8,01;8,23 | 5 |
| MASTER DATA 25 | L | 4 | 8,01;8,35 | 8,01;8,34 | 1 |
| MASTER DATA 26 | L | 4 | 8,01;8,36 | 8,01;8,34 | 1 |
| MASTER DATA 27 | L | 4 | 8,01;8,37 | 8,01;8,34 | 1 |
| MASTER DATA 28 | L | 4 | 8,01;8,38 | 8,01;8,34 | 1 |
| > INNER NODE 39 | C | 3 | 8,01;8,39 | 8,01;8,23 | 5 |

| NODE TEXT | D | LV | NODE ID | PARENT ID | TS |
|---|---|---|---|---|---|
| v ROOT NODE 01 | E | 1 | 8,01;8,01 | 8,01;8,00 | 85 |
| v INNER NODE 02 | E | 2 | 8,01;8,02 | 8,01;8,01 | 21 |
| > INNER NODE 03 | E | 3 | 8,01;8,03 | 8,01;8,02 | 5 |
| > INNER NODE 08 | E | 3 | 8,01;8,08 | 8,01;8,02 | 5 |
| v INNER NODE 13 | E | 3 | 8,01;8,13 | 8,01;8,02 | 5 |
| MASTER DATA 09 | L | 4 | 8,01;8,14 | 8,01;8,13 | 1 |
| MASTER DATA 10 | L | 4 | 8,01;8,15 | 8,01;8,13 | 1 |
| MASTER DATA 11 | L | 4 | 8,01;8,16 | 8,01;8,13 | 1 |
| MASTER DATA 12 | L | 4 | 8,01;8,17 | 8,01;8,13 | 1 |
| v INNER NODE 18 | E | 3 | 8,01;8,18 | 8,01;8,02 | 5 |
| MASTER DATA 13 | L | 2 | 8,01;8,19 | 8,01;8,18 | 1 |
| MASTER DATA 14 | L | 3 | 8,01;8,20 | 8,01;8,18 | 1 |
| MASTER DATA 15 | L |  | 8,01;8,21 | 8,01;8,18 | 1 |
| MASTER DATA 16 | L |  | 8,01;8,22 | 8,01;8,18 | 1 |
| v INNER NODE 23 | E |  | 8,01;8,23 | 8,01;8,01 | 21 |
| v INNER NODE 24 | E |  | 8,01;8,24 | 8,01;8,23 | 5 |
| MASTER DATA 17 | L |  | 8,01;8,25 | 8,01;8,24 | 1 |
| MASTER DATA 18 | L |  | 8,01;8,26 | 8,01;8,24 | 1 |
| MASTER DATA 19 | L |  | 8,01;8,27 | 8,01;8,24 | 1 |
| MASTER DATA 20 | L |  | 8,01;8,28 | 8,01;8,24 | 1 |
| v INNER NODE 29 | E |  | 8,01;8,29 | 8,01;8,23 | 5 |

FIG. 18

USER INTERFACE SUPPORT FOR LARGE HIERARCHIES

BACKGROUND

In data processing systems, many different types of data can be represented as a hierarchy. In practice, such hierarchies can include large or very large numbers of nodes (e.g., a million or more nodes). Providing a way for a user to interact with such large hierarchies can be challenging when operating over a limited bandwidth connection, such as in a cloud scenario. For example, it can take a considerable amount of time to send the hierarchy data back and forth between a backend and a frontend. Further challenges emerge when the hierarchy is edited by more than one user. Thus, there is room for improvement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In an example embodiment, a computer-implemented method comprises presenting a user interface comprising a visual depiction of currently visible nodes of a retrieved section of a hierarchy comprising a plurality of nodes; receiving an indication of a user interface activity on the hierarchy via the user interface; sending a refill request to a server computing system, wherein the refill request comprises an indication of the currently visible nodes of the retrieved section of the hierarchy; and receiving from the server computing system, a refilled section replacing the retrieved section of the hierarchy.

In another example embodiment, a computing system comprises one or more processors; a hierarchy comprising a plurality of nodes stored in one or more computer-readable media; and memory configured to cause the one or more processors to perform operations comprising: receive a refill request from a client computing system to refill a currently visible section of the hierarchy, wherein the refill request comprises an indication of the currently visible section of the hierarchy; responsive to the refill request, determining a refilled section of the hierarchy; and sending the refilled section to the client computing system.

In another example embodiment, one or more non-transitory computer-readable media comprises computer-executable instructions that, when executed, cause a computing system to perform a method comprising: receiving a refill request from a client computing system to refill a retrieved section of a hierarchy, wherein the hierarchy is stored at a server computing system, wherein a proper section of the hierarchy is currently visible at the client computing system in a user interface at the client computing system, wherein the refill request comprises an indication of the currently visible nodes of the hierarchy and an indication of a focus node; responsive to the refill request, determining a refilled section, wherein the refilled section is a proper hierarchy section and determining the refilled section comprises (a)-(c): (a) based on the currently visible nodes of the hierarchy, adding ancestors in the hierarchy of nodes in the refilled section, yielding a provisional set of nodes; (b) generating a list of nodes comprising the provisional set of nodes and any siblings of any nodes in the provisional set of nodes; and (c) limiting the provisional set of nodes based on the focus node; and sending the refilled section to the client computing system.

The foregoing and other objects, features, and advantages will become more apparent from the following detailed description, which proceeds with reference to the accompanying figures.

BRIEF DESCRIPTION OF THE DRAWINGS

FIG. 4 is a block diagram of an example retrieved section of a hierarchy.

FIG. 7 is a block diagram of a visible hierarchy section with underlying standard hierarchy attributes.

FIG. 8 is a block diagram of a visible hierarchy section with underlying standard hierarchy attributes after having applied a filter.

FIGS. 13, 14, 15, 16, 17, and 18 are block diagrams showing a visual section of a hierarchy and associated attributes.

DETAILED DESCRIPTION

Example 1—Overview

Hierarchies are common in computer science domain and are a proven way to structure and handle large volumes of data. Small hierarchies are simple to represent and also simple to manipulate via a user interface. However, once the hierarchy approaches a large or very large size, performance becomes a major consideration, especially in cloud scenarios. A traditional approach is to simply round trip the entire hierarchy back and forth between client and server each time a user interacts with the hierarchy. However, such an approach becomes unmanageable for large or very large hierarchies when provided in a cloud environment.

Another possible approach is to send entire consecutive parts of the hierarchy back and forth between a client and server. However, due to the complexities of expanded and collapsed nodes, such an approach also suffers performance problems.

Instead, a retrieved section of the hierarchy can be implemented as described herein. When a user interface activity cannot be carried out locally (e.g., one or more nodes are not in the retrieved section), a refill request can be sent as described herein. The refill request can indicate which nodes are currently visible at the client, which allows intelligent, efficient selection of which nodes to include in the refilled section that is sent back to the client.

The refilled section can take the form of a proper section of the hierarchy so that a user's expectations regarding the user interface are met, leaving the user with the impression that the hierarchy is local, when in fact sections of the hierarchy are being communicated between the client and server computing systems. The refilled section can also be an updated version of the hierarchy, including any edits made by other users.

The described technologies can incorporate features such as drillstate preservation, concurrent editing, filtering, and others.

The technologies can thus offer superior performance when compared to traditional techniques and thus offer considerable improvements over traditional techniques for presenting a hierarchy in a user interface, especially with regard to user experience, even for large hierarchies.

Figure 1:
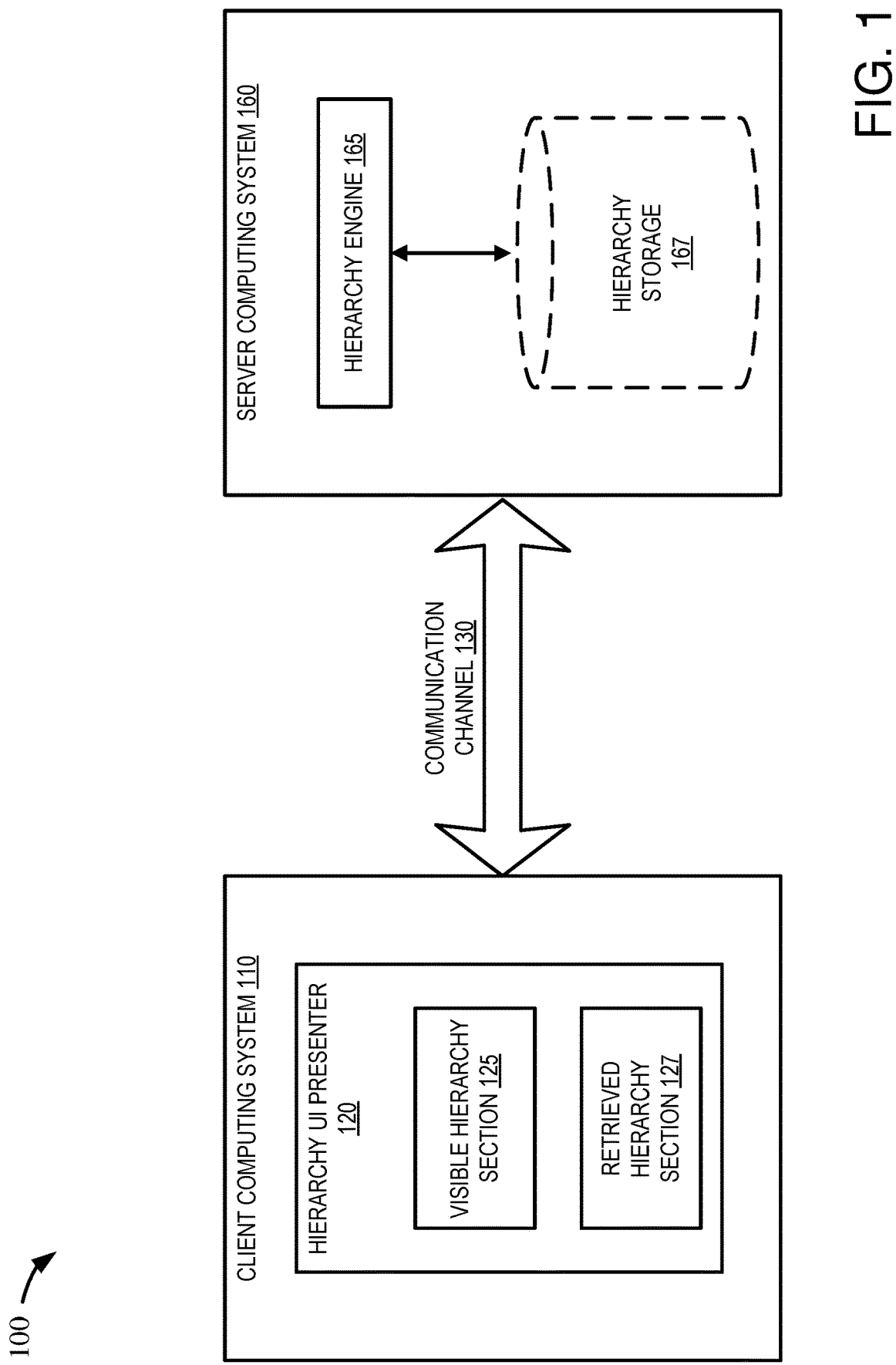
FIG. 1 is a block diagram of an example overall system implementing user interface support for large hierarchies.

Example 2—Example System Implementing User Interface Support for Large Hierarchies FIG. 1 is a block diagram of an example system 100 implementing user interface support for large hierarchies and can be used to implement any of the examples described herein. In the example, the system 100 can be implemented in an environment comprising a client computing system 110 in communication with a server computing system 160 over a communication channel 130. The client computing system is sometimes called the "frontend," and the server computing system is sometimes called the "backend." From the perspective of the client computing system 110, the hierarchy 167 is stored remotely and accessed over a communication channel 130 (e.g., based on an Internet protocol, as part of a cloud computing scenario, or the like). In practice, the communication channel may have limited network bandwidth, which presents a high latency for a communication roundtrip. A stateless communication protocol can be used, and concurrent display and editing of a hierarchy by multiple client computing systems can be supported.

The client computing system 110 comprises a hierarchy user interface presenter 120; as described herein, the hierarchy user interface presenter 120 can implement retrieved hierarchy section 127 and a currently visible portion 125 of the hierarchy section 127. In practice, the sections 125 and 127 need not be separately stored. For example, an indication of which of the nodes in 127 that are currently visible can serve as an indication of the currently visible portion 125 of the retrieved hierarchy section 127.

If desired, the client computing system 110 can implement the hierarchy user interface presenter 120 in an Internet browser that accesses the server computing system 160 as part of a cloud computing environment (e.g., over the Internet, intranet, extranet, or the like).

The server computing system 160 can comprise a hierarchy engine 165 that handles the logic and logistics of storing and communicating the hierarchy, which is ultimately stored in the hierarchy storage 167.

In practice, the systems shown herein, such as system 100, can vary in complexity, with additional functionality, more complex components, and the like. For example, there can be additional functionality within the hierarchy engine 165. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

In a cloud or Internet environment, users can interact with hierarchy via a user interface on a frontend component (e.g., web browser) running on the user's device (e.g., a client computing system). The hierarchy data and the hierarchy processing engine, however, reside in a separate server computing system, for example in a cloud datacenter. The frontend and backend communicate via a channel (e.g., based on the Internet protocol).

The system 100 and any of the other systems described herein can be implemented in conjunction with any of the hardware components described herein, such as the computing systems described below (e.g., processing units, memory, and the like). In any of the examples herein, the hierarchy nodes, parameters, and the like can be stored in one or more computer-readable storage media or computer-readable storage devices. The technologies described herein can be generic to the specifics of operating systems or hardware and can be applied in any variety of environments to take advantage of the described features.

Figure 2:
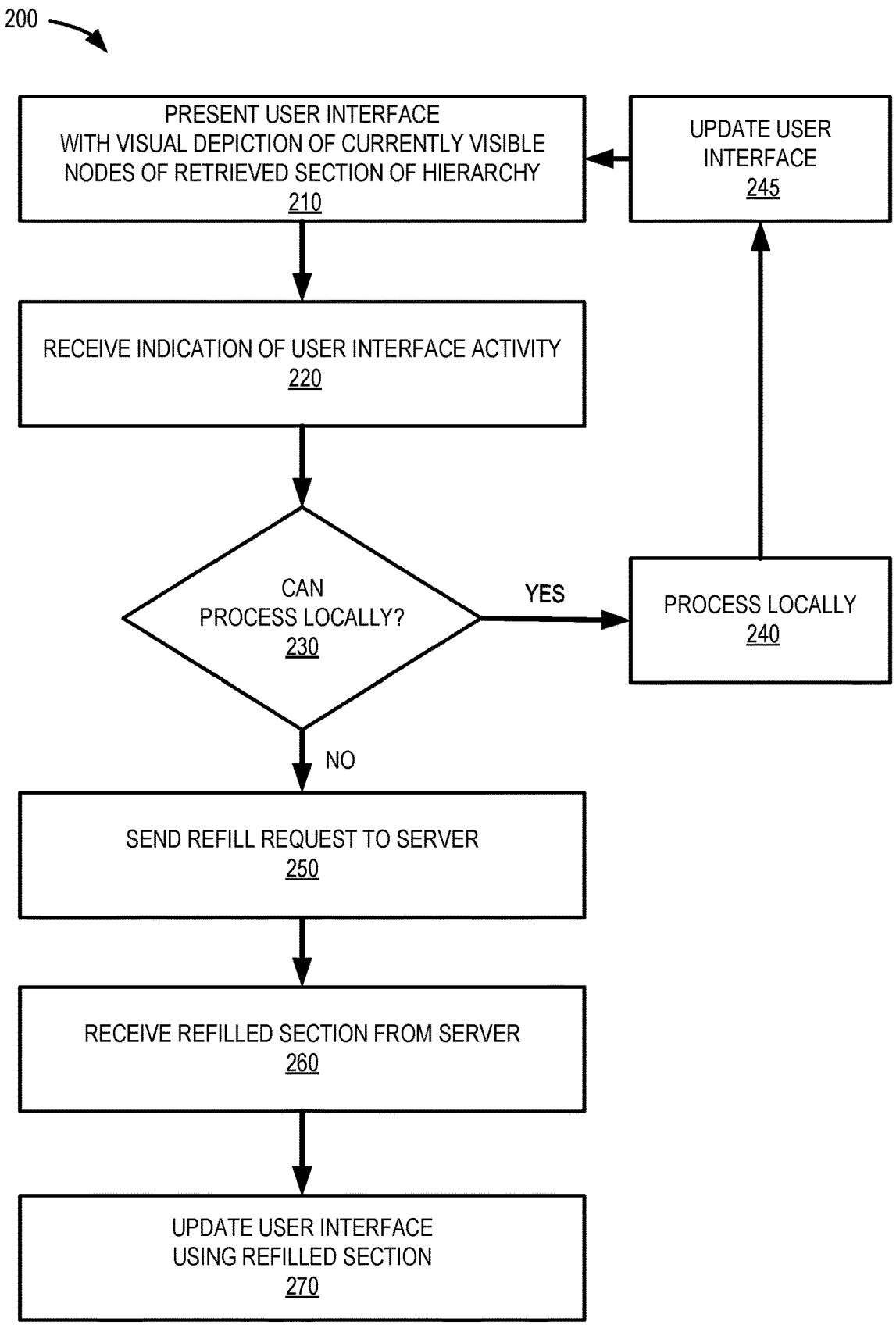
FIG. 2 is a flowchart of an example overall method of user interface support for large hierarchies on the client side.

Example 3—Example Method Implementing User Interface Support for Large Hierarchies on Client Side FIG. 2 is a flowchart of an example method 200 of user interface support for large hierarchies and can be performed, for example, by the client computing system 110 of FIG. 1 that is part of a cloud computing environment, working in concert with a server computing system 160. The method 200 can support rapid updates to the user interface and provide a suitable user experience even when processing large hierarchies.

At 210, a user interface is presented with a visual depiction of the currently visible nodes of a retrieved section of the hierarchy, which comprises a plurality of nodes. Various types of user interfaces can be implemented and take advantage of the technologies described herein to support a wide variety of use cases.

At 220, an indication of a user interface activity on the hierarchy is received via the user interface. In practice, such an indication can be the result of user interaction with the client computing system via any number of techniques, whether a conventional graphical user interface, touchscreen, virtual environment, or the like. As described herein, user interface activities such as scrolling, expanding, collapsing, and the like can be supported.

At 230, it is determined whether the user interface activity can be processed locally at the client computing system. If so, it is processed locally at 240, and processing continues at 245, where the user interface is updated to reflect the activity, and the user interface continues to be presented at 210.

Otherwise, at 250, responsive to determining that the user interface activity cannot be processed locally at the client system, a refill request is sent to the server computing system. As described herein, such a refill request for a refilled section to replace the retrieved section of the hierarchy comprises an indication of the currently visible nodes of the retrieved section of the hierarchy.

At 260, a refilled section replacing the retrieved section of the hierarchy is received from the server computing system. As described herein, the retrieved section is less than the entire hierarchy, and it can be a proper section of the hierarchy.

The refilled section replacing the retrieved section of the hierarchy can reflect having performed the user interface activity on the hierarchy.

At 270, the user interface can be updated using the refilled section. Such updating can reflect having performed the user interface activity on the hierarchy, based on the refilled section replacing the retrieved section of the hierarchy.

In practice, the method 200 can be repeated a plurality of times (e.g., for a series of user interface activities). A basic version of the method 200 comprises the actions of 210, 220, 250, and 260.

The method 200 can incorporate any of the methods or acts by systems described herein to achieve user interface support for large hierarchies.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For example, from a client perspective, the refill request is sent; however, from a server perspective, the refill request is received.

Example 4—Example Server-Side Method

Figure 3:
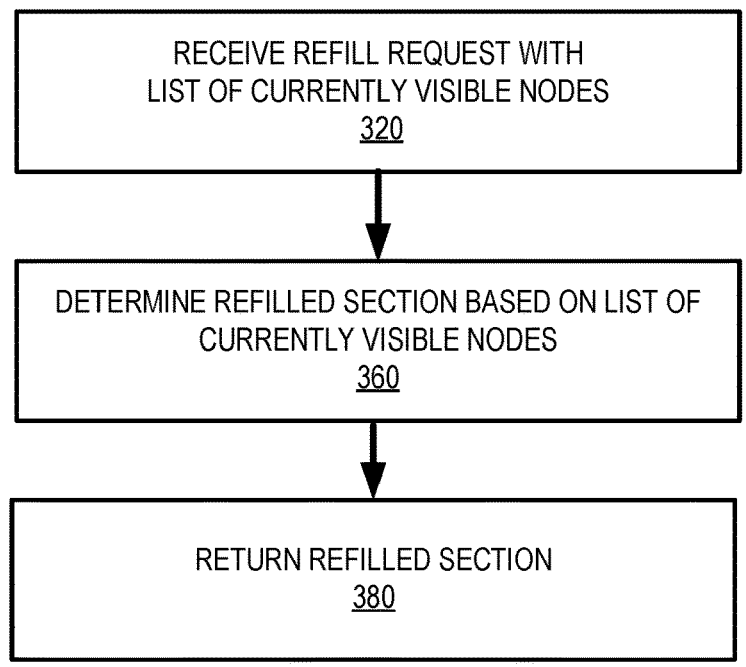
FIG. 3 is a flowchart of an example method of implementing user interface support for large hierarchies on the server side.

FIG. 3 is a is a flowchart of an example method 300 of implementing user interface support for large hierarchies on the server side that can be used in any of the examples herein. The method 300 can be implemented, for example, by the server computing system 160 of FIG. 1 operating in concert in an environment comprising a client computing system 110. Such a server computing system also comprises one or more processors and the stored hierarchy, which comprises a plurality of nodes. Memory at the server computing system can be configured to cause the one or more processors to perform operations comprising the operations of the method.

At 320, a refill request is received from a client computing system. The refill request can be a request to refill a currently visible section of the hierarchy. The refill request can comprise an indication of the currently visible section of the hierarchy (e.g., a list of the nodes currently visible in the user interface at the client computing system). As described herein, an indication of a focus node (e.g., one of the nodes of the currently visible section) can also be included in the refill request.

At 360, responsive to the request, a refilled section of the hierarchy can be determined, based on the indication of the currently visible nodes. Nodes to be included in the refilled section can be based on the indication of the focus node. Any updates to the hierarchy made by other client computing systems can be included. As described herein, a specific process can be followed for determining the refilled section as a proper hierarchy section with reference to ancestor and sibling nodes.

At 380, the refilled section can be sent to the client computing system. As described herein, the drillstate can be included, and such drillstate can preserve the drillstate as indicated by the currently visible section of the hierarchy in the request.

The refilled section can then be used at the client computing system to present an updated user interface reflecting whatever user interface activity triggered the refill request. In practice, the method 300 can be repeated for a plurality of user interface activities during manipulation of the hierarchy.

Example 5—Example Hierarchies

In any of the examples herein, a hierarchy can take the form of a plurality of nodes arranged in a data structure (e.g., a tree having a root). In some cases, a collection of hierarchies can be treated as a single hierarchy. For example, there could be more than one root, and the technologies described herein can still be applied with advantage. Non-standard hierarchies can also be supported as described herein.

Example 6—Example Nodes

In any of the examples herein, a node of a hierarchy is stored in one or more non-transitory computer-readable media; it can be implemented as any number of data types and comprises attributes. In practice, such attributes can include underlying attributes (e.g., with technical or business semantics such as an employee name an identifier comma the material number of a machine part, or an account number). As described herein, nodes can also have standard hierarchy attributes that are used by the technologies described herein to manage and interact with the hierarchy, regardless of the use case or domain. In practice, such standard hierarchy attributes can be supported by hierarchy engine.

Example 7—Example Hierarchy Storage

A server computing system can maintain persistent storage for raw hierarchy data of various applications that have respective individual structures or schema. The hierarchy engine is able to process the raw hierarchy data on request, enrich it, and bring it into a common format suitable for display in a user interface, which is so called "enriched hierarchy data." Data in an enriched hierarchy data format can be created on request and may be cached on the server to improve performance.

Requests from the client computing system via the communication channel can retrieve only a section of the enriched hierarchy data and keep it as a retrieved hierarchy section as part of the user session on the client. The retrieved hierarchy section can be refreshed (i.e., refilled) from the server responsive to the occurrence of certain events, for example if the user expands a node or scrolls into hierarchy nodes that were not retrieved before, changes filters, or changes the hierarchy.

The different hierarchy data structures (e.g., raw, enriched, retrieved, visible) for the same hierarchy can include the underlying attributes, which may differ from hierarchy to hierarchy.

The raw hierarchy data need not include any standardized attributes but can have an individual format that varies as appropriate. The standard hierarchy attributes can be derived by the hierarchy engine based on the hierarchy definition for these raw data.

In practice, a plurality of standard hierarchy attributes can include a node identifier (e.g., unique identifier for a hierarchy node that stores underlying attributes), node_text (e.g., human-readable, semantic name of a node), parent_id (identifier of the parent), hierarchy_level (e.g., level of the node in the hierarchy), hierarchy_tree_size (e.g., number of nodes in the subtree of the node), hierarchy_rank (e.g., preorder rank of the node), hierarchy_parent_rank (e.g., preorder rank of the parent node), and drillstate (state of a node in a section: expanded, collapsed, or leaf), or the like. Table A shows the standard hierarchy attributes and indicates in which hierarchy data structure(s) the standard hierarchy attributes are available.

TABLE A

Standard Hierarchy Attributes

| Attribute | Enriched? | Retrieved? | Visible? |
| --- | --- | --- | --- |
| node_id | Yes | Yes | No |
| node_text | Yes | Yes | Yes |
| parent_id | Yes | Yes | No |
| hierarchy_level | Yes | Yes | Yes |
| hierarchy_tree_size | Yes | Yes | No |
| hierarchy_rank | Yes | Yes | No |
| hierarchy_parent_rank | Yes | Yes | No |
| drillstate | No | Yes | Yes |

In practice, the attributes can be implemented as attribute name, attribute value pairs. The attribute name need not be explicitly stored (e.g., it can be implied by position, order, or other convention), and values can be compressed, encoded, or the like. Attributes are sometimes called "properties" or "fields."

Example 8—Example Node Rank

In any of the examples herein, a node rank can be used to specify an ordering for nodes; such an ordering can be useful when displaying to determine the order in which nodes appear. Even if the underlying data can operate without regard to an order, an order can be useful for the user interface (e.g., so that the nodes maintain an order as the user interacts with the interface).

A pre-order node rank can be used, which essentially assigns a node rank based on a preorder traversal (e.g., depth-first) of the hierarchy. In practice, such a traversal need not actually occur; the order simply indicates the order if such a traversal were undertaken.

Other ordering schemes are possible, such as post-order or the like.

A similar technique can be used to denote the node rank of a parent node.

Example 9—Example Currently Visible Nodes

In any of the examples herein, a set of nodes that are currently displayed in the user interface at the client can be designated as currently visible nodes. The user interface typically shows only a part of the retrieved hierarchy section, which is the currently visible hierarchy section. Sometimes, when the retrieved section has more nodes than the visible section, user interface activities like scrolling can be quickly served by the client without the need to call the server.

In some cases, the currently visible nodes can be those designated as those that would be currently visible upon completion of the user interface activity (e.g., a scroll activity that would result in showing nodes that are present locally but not actually being currently presented).

So, the user interface presenter has some flexibility regarding what it can designate as a currently visible node; it need not be limited to nodes from the visible hierarchy section. For example, nodes that are locally retrieved and could be visible can be included in a list of currently visible nodes. Such an arrangement can be helpful when a scroll user activity is performed (e.g., in the case of a scroll up activity, previously visible nodes on the previous page can be included in the list of currently visible nodes of a refill request). In such a case, some nodes may not be currently displayed, but will be upon completion of the scroll user interface activity, so locally available nodes that will be displayed upon completion of a user interface activity (e.g., scroll user interface activity) can be included in the list of currently visible nodes of a refill request. A smoother user interface experience can result, and drillstate can also be better preserved in some cases (e.g., where such nodes are children of an expanded node). The user interface presenter can choose such an option to provide a better user experience depending on the characteristics of the data.

So, if the user interface activity comprises a scroll up activity, at least one node included in the list of currently visible nodes may not be currently displayed (e.g., if the node is a child node of a parent node that was previously expanded in the user interface). Including the indication of the at least one node not currently displayed at the client as a currently visible preserves drillstate of the at least one node not currently displayed.

Example 10—Example Proper Section of the Hierarchy

In any of the examples herein, a hierarchy section can be generated to be a proper hierarchy section of the hierarchy. A proper hierarchy section is a consecutive set of nodes of a hierarchy in a certain drill state, ordered by the hierarchy node ordinal number. The proper hierarchy section can be constructed from a filtered hierarchy. If so, the proper section is a consecutive set of nodes of the filtered hierarchy.

A proper hierarchy section can take the form of a set of nodes of a (filtered) hierarchy, ordered by the standard hierarchy order, cut from an ordered set of nodes that contains all ancestors of its elements, and with an expanded node, all its children.

Use of a proper hierarchy section can ensure that no nodes are missing when showing the section to the user.

For example, the hierarchy section 500, its visible section shown in 600, the visible hierarchy section 700, and visible hierarchy section 800 are proper hierarchy sections. As shown, not all children for a node need be present in the proper hierarchy section because it can be cut from a section that does. However, siblings are not skipped (unless due to a filter).

Example 11—Example Node Identifier

A node can be uniquely identified in communications between a client and a server. In any of the examples herein, a node identifier can uniquely identify a node. Such an identifier can take any variety of formats as implemented by the hierarchy engine. In a situation involving multiple hierarchies, the node identifier can include an identifier of the hierarchy or a root node of the hierarchy to distinguish nodes from the multiple hierarchies.

Some examples show a particular format in which key fields are concatenated together (e.g., an identifier of the node and an identifier of the parent node) along with an indication of the length of the key field (e.g., "8,00000001; 8,00000002"), but any number of other formats that uniquely identify nodes can be used.

Example 12—Example Node Identifier Supporting Non-Standard Hierarchies

In any of the examples herein, the hierarchy may take the form of a non-standard hierarchy. In a standard hierarchy, where a node has at most a single parent, and no cycles exist, a standard node identifier attribute can be a reliable identifier for a node.

In non-standard hierarchies, however, the enriched hierarchy data may contain a node multiple times, with different hierarchy ranks. This is a consequence of the hierarchy engine's effort to convert the raw hierarchy into a standard hierarchy in the enrichment step by duplicating the non-standard node(s).

The hierarchy rank cannot be used as a unique identifier of a node in such a scenario because it can change with every change of the hierarchy. In such a case, the hierarchy rank kept in the client would not match the new rank determined at the server.

The technologies can use the ancestor path of the technical node identifiers from a node to its root node as an identifier because such a path uniquely identifies a node in both standard and non-standard hierarchies.

So, instead of using a single node identifier, in the case of a non-standard hierarchy, a sequence of node identifiers from the node up to its root node can be used.

Example 13—Example Client Computing System

In any of the examples herein, a client computing system (or simply "client") can take the form of a computing system as described herein. In practice, a user can employ an Internet browser or some other program that visually presents the hierarchy for manipulation via a user interface at the client.

Example 14—Example Server Computing System

In any of the examples herein, a server computing system (or simply "server") can take the form of a computing system as described herein. Such a system supports a cloud computing scenario and can host a plurality of client computing systems concurrently interacting with a same hierarchy. For example, a user interface is presented at a first client computing system for editing the hierarchy, and the hierarchy is concurrently presented at a second client computing system for editing the same hierarchy.

Example 15—Example Retrieved Section Implementation

FIG. 4 is a block diagram of an example implementation of a retrieved section 400 of a hierarchy and can be implemented in any of the examples herein. The retrieved section comprises a plurality of nodes 420 and can be received from a server computing system. The section 400 thus can be enriched with standard hierarchy attributes as described herein but also includes a drillstate, which is specific to the client computing system (e.g., one client computing system can have a different drillstate for a same node in a same hierarchy).

In the example, a display name 420A (e.g., node text), drillstate 421A, level (e.g., hierarchy level) 422A, node identifier 423A, parent identifier 425A, position information 427A (e.g., rank), and parent rank 429A can be included for the plurality of nodes (e.g., 420) in the hierarchy. Tree size can also be included and leveraged by the user interface (e.g., to give some indication on the user interface of how many nodes are in the tree, which can be helpful as nodes are expanded, collapsed, and scrolled).

As described herein, in practice, a currently visible hierarchy section can be based on the retrieved section, but some nodes may be retrieved but not visible (e.g., the currently visible nodes can be a subset of the retrieved section).

Example 16—Example Tree Diagram of Hierarchy Section

Figure 5:
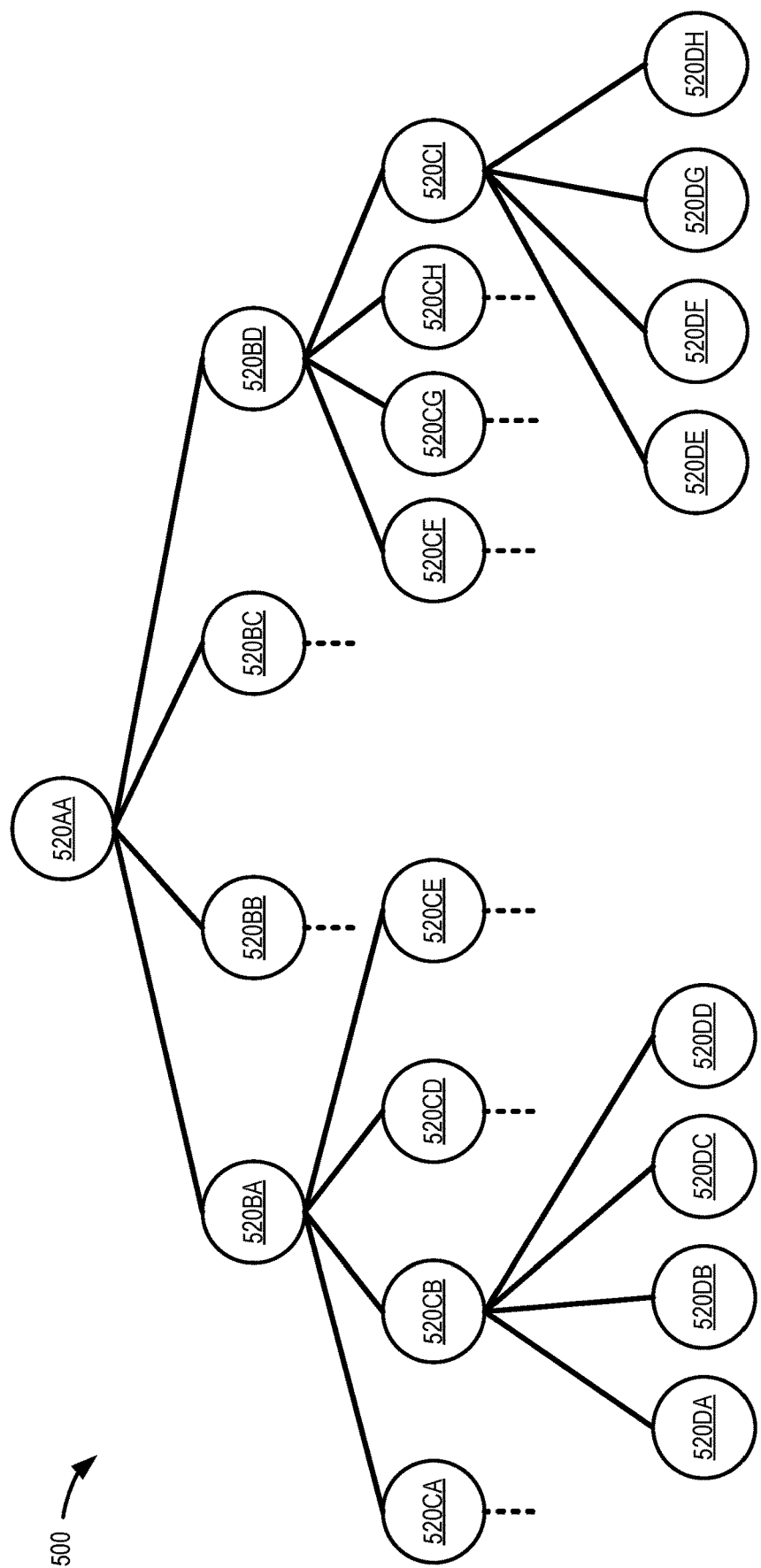
FIG. 5 is a tree diagram of an example retrieved section of a hierarchy.

FIG. 5 is a tree diagram of an example retrieved section 500 of a hierarchy that can be implemented in any of the examples herein. For sake of illustration, the section 500 is shown in tree form.

The root node 520AA has four children 520BA, 520BB, 520BC, and 520BD. Such children are sometimes called "inner nodes" because they are underneath the root but are not leaf nodes. Some children of the hierarchy stored at the server (e.g., the children under 520BB) are not included in the retrieved section. As a result, if parents of such nodes are expanded, a refill request will be sent to refill the retrieved section accordingly.

Further inner nodes 520CA, 520CB, 520CD, 520CE, 520CF, 520CG, 520CH, and 520CI can also be included.

The leaf nodes 520DA, 520DB, 520DC, 520DD, 520DE, 520DF, 520DG and 520DH can also be included. Although the leaf nodes are shown as being the same shape in the diagram, in practice, such leaf nodes can be of a same data type as the root and inner node, but alternatively can be different (e.g., to store different or additional information than the other nodes).

Example 17—Example Block Diagram of User Interface

Figure 6:
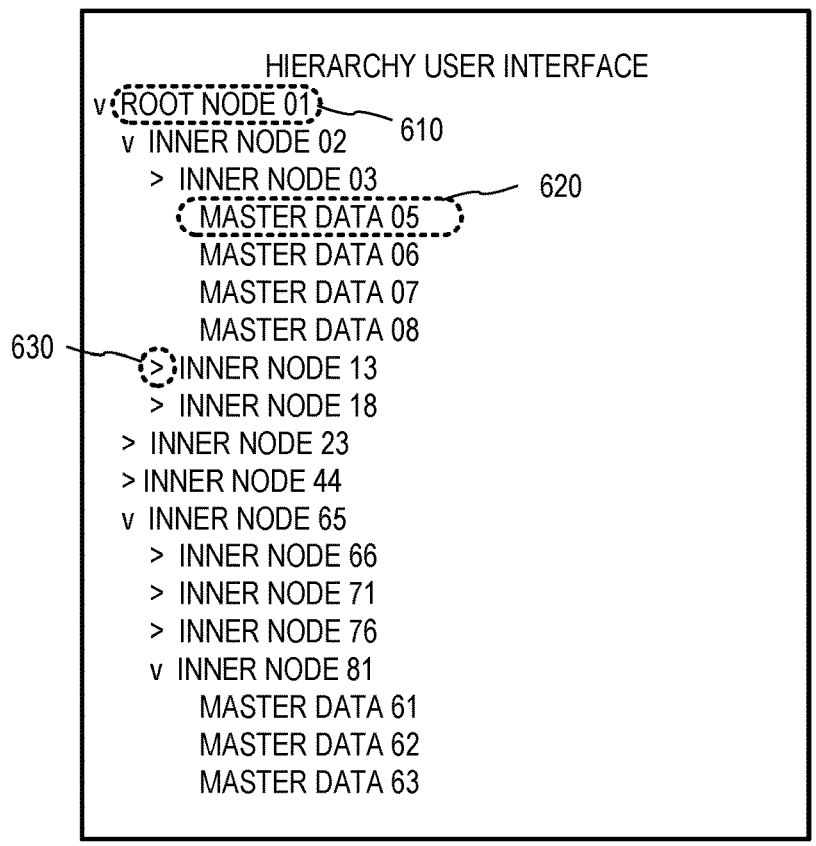
FIG. 6 is a block diagram of an example user interface supporting large hierarchies displayed by a client.

FIG. 6 is a block diagram of an example user interface 600 supporting large hierarchies displayed by a client and can be implemented in any of the examples herein. In the example, the user interface 600 presents a portion of the retrieved section 500 of FIG. 5 (e.g., all the nodes except 520DH).

In the example, the root node (i.e., "root node 01") is presented at the top, with other inner nodes below it. Some nodes are collapsed, while others are expanded. A user interface element 630 can be activated to initiate a user interface activity of expanding a node (i.e., if it is collapsed) or collapsing a node (i.e., if it is expanded). Leaf nodes (e.g., 620) cannot be expanded or collapsed because they have no children.

Due to screen size limitations, one of the retrieved nodes (e.g., 520DH) is not included in the user interface. However, the data for the node is there locally and in some cases can be subsequently displayed based on the locally available data at the client, rather than sending a refill request to the server.

The actual form of the user interface can vary considerably from that shown while still taking advantage of the technologies described herein. For example, a virtual reality presentation, color coding for collapsed/expanded nodes, different fonts for leaf nodes, etc. can easily be implemented as appropriate on the client side while taking advantage of the technology for refill requests, which provides a superior user experience, regardless of the user interface specifics.

Another user interface variation is wherein the user interface incorporates tree size. For example, the number of nodes under a collapsed node can be presented in the user interface (e.g., proximate the collapsed node). Any number of indications can be used, such as the actual number itself, a thermometer depicting how many nodes, a color, or the like. Such an interface can usefully give the user an indication of how many nodes are under the collapsed node, which may be of interest when interacting with the hierarchy in the user interface. Other variations are possible.

Example 18—Example Visible Hierarchy Section

FIG. 7 is a block diagram of a visible hierarchy section 700 with underlying standard hierarchy attributes and is an internal, stored representation corresponding to the user interface 600 of FIG. 6. In the example, the node text is shown similar to that of FIG. 6 for sake of comparison; however, in practice, the node text can be represented internally using any technique that stores text.

Each node is shown having the following standard hierarchy attributes: a node text, drillstate, level, node identifier, parent identifier, tree size, rank, and parent rank as described herein. Based on the attributes, the user interface 600 of FIG. 6 can be constructed. The tree size is not used in the example user interface 600 of FIG. 6 but could be incorporated as described herein.

As in FIG. 6, the visible hierarchy section 700 contains a portion of the retrieved section 500 of FIG. 5 (e.g., all the nodes except 520DH).

Example 19—Example Visible Hierarchy Section with Filter

FIG. 8 is a block diagram of a visible hierarchy section 800 with underlying standard hierarchy attributes and is an internal stored representation corresponding to the user interface that is presented when a filter is applied to the visible hierarchy section of FIG. 7. In the example, the filter is "node text contains '6'".

The last node 820 shown in the section appears because there is now sufficient screen real estate in the display window for the node to be presented in the user interface. In practice, such a node may be part of a retrieved section (e.g., node 520DH of FIG. 5), and therefore can be presented without generating a refill request to the server. However, if such node was not present locally, a refill request could be sent to the server to retrieve the node 820.

Some of the nodes appear even though they do not seem to meet the filter criteria because they are collapsed nodes with child nodes underneath them that do meet the filter criteria. In practice, a refill request may be sent to the server in order to determine whether such nodes do have children nodes that meet the filter criteria.

Example 20—Example User Interface Activities

In any of the examples herein, a user interface activity can take any number of activities that can be performed on the user interface of the hierarchy during interaction with the hierarchy by a user. In practice, such a user interface activity appears to be performed on the visible hierarchy section from the perspective of a user at the client. The user experience can be tailored to provide a high-performance response by the user interface, even though the hierarchy itself is large and is stored remotely.

There are typically two possible actions that result from the user interface activity. In some cases, processing can be accomplished by a local version of the hierarchy (i.e., the retrieved hierarchy section). In other cases, a user interface activity results in a refill request that retrieves hierarchy nodes form the server. The number of nodes retrieved can depend on the number of nodes that can be displayed on the available screen area and on the extra number of nodes for the retrieved hierarchy section.

User interface activities can include scrolling up or down (e.g., activating a scroll bar, pressing an arrow key, swiping, dragging, or other indication). Responsive to receiving an indication of a user interface activity of scroll up or scroll down, two possible actions are possible. As long as it is possible to shift the visible section up or down within the retrieved hierarchy section, the visible window can simply be shifted up or down. Otherwise, responsive to determining that the shift leaves the retrieved hierarchy section, the retrieved hierarchy section can be refilled from the server by sending a refill request so that the scroll up or down can be completed in the user interface as expected.

User interface activities can include collapsing a node (e.g., node collapse by activating a user interface element such as "−" "v" or the like). Responsive to receiving an indication of a user interface activity of collapsing a node, two possible actions are possible. The collapsed subtree can be marked in the retrieved hierarchy section and removed from the visible section. The visible section can then be filled up at the end from the retrieved section, if possible. Otherwise, responsive to determining that the visible section cannot be filled up at the end from the retrieved section, the retrieved hierarchy section can be refilled from the server by sending a refill request so that the visible section can be filled up in the user interface as expected.

User interface activities can include expanding a node (e.g., node expand by activating a user interface element such as "+" "<" or the like). Responsive to receiving an indication of a user interface activity of expanding a node, two possible actions are possible. If the child nodes of the expanded node are available in the retrieved section (e.g., from a previous collapse), they can just be made visible again and the surplus visible nodes at the end are made invisible. Otherwise, responsive to determining that the child nodes of the expanded node are not available in the retrieved section, the retrieved hierarchy section can be refilled from the server by sending a refill request that retrieves the child nodes of the expanded nodes, and the child nodes can be displayed to the extent possible within the user interface.

User interface activities can include a refresh (e.g., explicitly triggered by a user interface activity or automatically after changing a filter or the hierarchy). Responsive to an indication of a refresh, the retrieved hierarchy section can be refilled from the server by sending a refill request. The visible section can be updated accordingly.

The initial select when opening the hierarchy user interface can also be considered a user interface activity. Typically, a number of levels for an initial drill-down is specified. Starting with the first root node, the requisite number of nodes can be retrieved from the server in the standard hierarchy order (i.e., the retrieved section), expanded to the specified level. Further nodes need not be retrieved. Attributes of the initial retrieved hierarchy section can be provided by the server. The first nodes that fit into the screen area can be made visible as the visible hierarchy section.

Example 21—Example Focus Node

In any of the examples involving a refill request, a focus node can be specified. As a preparation for the refill request, if a user interface activity involves a refill, a focus node can be chosen (e.g., by the client) around which the new section is retrieved. In some cases, the focus node may not be available (e.g., due to a changed filter). If so, responsive to determining that the focus node is not available, a fallback focus node can be chosen by the server (e.g., with guidance from information in the request).

The focus node can be chosen from the displayed nodes or as a node that is anticipated to be displayed after the user interface activity is performed.

The focus node can serve as an anchor point for the user interface context when the retrieved section is refilled by a refill request as described herein. In this way, the user interface can be presented in a way that meets the expectations of the user (e.g., continuity of the user interface is maintained between refill requests).

Any method involving the hierarchy can comprise choosing a focus node of the hierarchy, wherein the refill request comprises an indication (e.g., identifier) of the focus node and generation of the refilled section of the retrieved section of the hierarchy is based on the focus node.

As described herein, the focus node may be determined by the server to be missing. If so, the server can choose a fallback focus node other than the focus node. Guidance from the client can be included in the refill request.

Example 22—Example Processing of User Interface Activities

In any of the examples herein, based on the originally visible nodes and the activity, new visibility status of the nodes can be determined. The activities, indication of the focus node, an indication of the fallback node (e.g., whether to choose a following node or a preceding node at the server), and visibility strategy are shown in Table B.

TABLE B

| User Interface Activities | | | |
|---|---|---|---|
| Activity | Focus Node | Fallback | Strategy |
| Scroll up | First visible node (before scrolling) | Following node | Start visibility #(scrolling width) nodes before the focus node |
| Scroll down | Last visible node (before scrolling) | Preceding node | Start visibility #(screen length - scrolling width - 1) nodes before the focus node |
| Collapse | Collapsed node | Preceding node | Try to keep first visible node visible but shift to make the focus node visible |
| Expand | Expanded node | Preceding node | Try to keep first visible node but shift to make the focus node visible; when shifting, make the focus node the first visible |
| Refresh | First visible node | Preceding node | keep the first visible node if possible |

Other user interface activities can be supported.

After the refill of the retrieved hierarchy section, a subset of the returned nodes can be chosen for display. Depending on user interface activities, other nodes are expected to be made visible. For a user interface activity, the client can implement an intelligent strategy for selecting nodes from the retrieved hierarchy section to achieve the expected user experience. Table B above describes visibility strategies with good user experience.

Example 23—Example Hierarchy Engine

In any of the examples herein, a hierarchy engine can be implemented to handle requests from clients to interact with a hierarchy stored at a server. For example, as described herein, the hierarchy may be stored in a raw data format, and the hierarchy engine can enrich such data when providing it to a client for display.

A hierarchy engine can perform a wide variety of hierarchy operations on different types of hierarchies covering a wide variety of use cases.

The hierarchy engine is free to adopt strategies for improving performance as needed. For example, order in the hierarchy as stored may not correspond to display order, but a display order can be implemented to ensure that the hierarchy is displayed in a consistent order as expected by a user.

The hierarchy engine can be designed to implement strategies for handling details such as implementing ordering or nodes, optimizing storage, managing concurrent editing, creating new hierarchies, applying filters, and the like.

The technologies described herein can be implemented in a hierarchy engine or a tool working in conjunction with the hierarchy engine so that clients can enjoy access to rich hierarchy functionality while preserving an acceptable user experience in light of large hierarchies.

Example 24—Example Drillstate

In any of the examples herein, the visual depiction of the hierarchy can include a drillstate of one or more nodes. For example, a node may have one or more children and be indicated in the user interface as expanded or collapsed. Expanded nodes include a visual depiction of the children, whereas collapsed nodes do not. A visual indicator (e.g., +, -, \/, >, or the like) can be used to indicate a node state, and such state can be stored internally as described herein.

Drillstate is specific to a user session and therefore can be different from client to client or session to session within the same client.

Example 25—Example Preservation of Drillstate

In any of the examples herein, drillstate of the visual depiction of the hierarchy can be preserved during navigation and user interface activities. Thus, the drillstate is preserved after updating the user interface. In practice, when navigating within the hierarchy, a user expects the drillstate to be preserved, so the technologies described herein can do so. As described herein, drillstate can be reconstructed at the server based on the indication of visible nodes received from the client as part of a refill request. In some cases, drillstate may not be fully preserved, but parameters (e.g., size of refill request) can be tuned to increase the probability of preservation based on the characteristics of the hierarchy itself.

To assist in preservation of drill state, the list of nodes can be sorted in standard hierarchy order (e.g., children come after their parent, etc.) The ordering can be independent from the user interface order and the standard order of the enriched hierarchy data in the backend. Responsive to determining that a node in the list is a leaf of the (filtered) hierarchy, the node is assigned the drillstate "leaf." The property leaf is independent from the user interface representation and is available in the enriched hierarchy data on the server. If a node is not a leaf, then responsive to determining that the subsequent node in the list is not a child of the node, the node is assigned the drillstate "collapse." Responsive to determining that the subsequent node in the list is a child of the node, the node is assigned the drillstate "expanded."

The general communication protocol for preserving drill state can be that the client sends the nodes to be displayed to the server as part of the refill request. In response, the server can optionally add further nodes to be displayed (e.g., if the user expands a node, the server adds its children). It then determines a proper hierarchy section containing the nodes, determines drillstate of such nodes, and determines a consecutive subsection of the resulting section (e.g., of the size requested by the client and containing a focus node) that the user typically wants to see. A focus node can serve as an anchorpoint for the user interface context. The sublist is then returned to the client.

Example 26—Example Refill Request Operation

Some hierarchy functionality for the user interface activities can be programmed in a standard, straightforward way. However, refilling the retrieved hierarchy section in such a way that the user context, visibility, and drillstate of nodes are kept, while simultaneously refreshing the hierarchy with possible changes made to the data in the backend can be accomplished via the technologies described herein.

Multiple challenges can be met for the refill. For example, if possible, the previously shown nodes can continue to be shown in the same drillstates after the refill is done. Sufficient nodes can be selected before and after the focus node to show enough visible nodes. The latest filters and changes in the server may exclude some of the previously shown nodes, including the chosen focus node.

As described herein, input parameters and methods can be implemented to address such challenges. The refill of a retrieved hierarchy section can be provided as a specific server operation that is available to the client in a single roundtrip. For example, responsive to a single refill request from the client, a single response with one refilled section is sent in reply from the server, and the one refilled section is sufficient to reflect the user interface activity in the user interface at the client.

Example 27—Example Refill Request System

Figure 9:
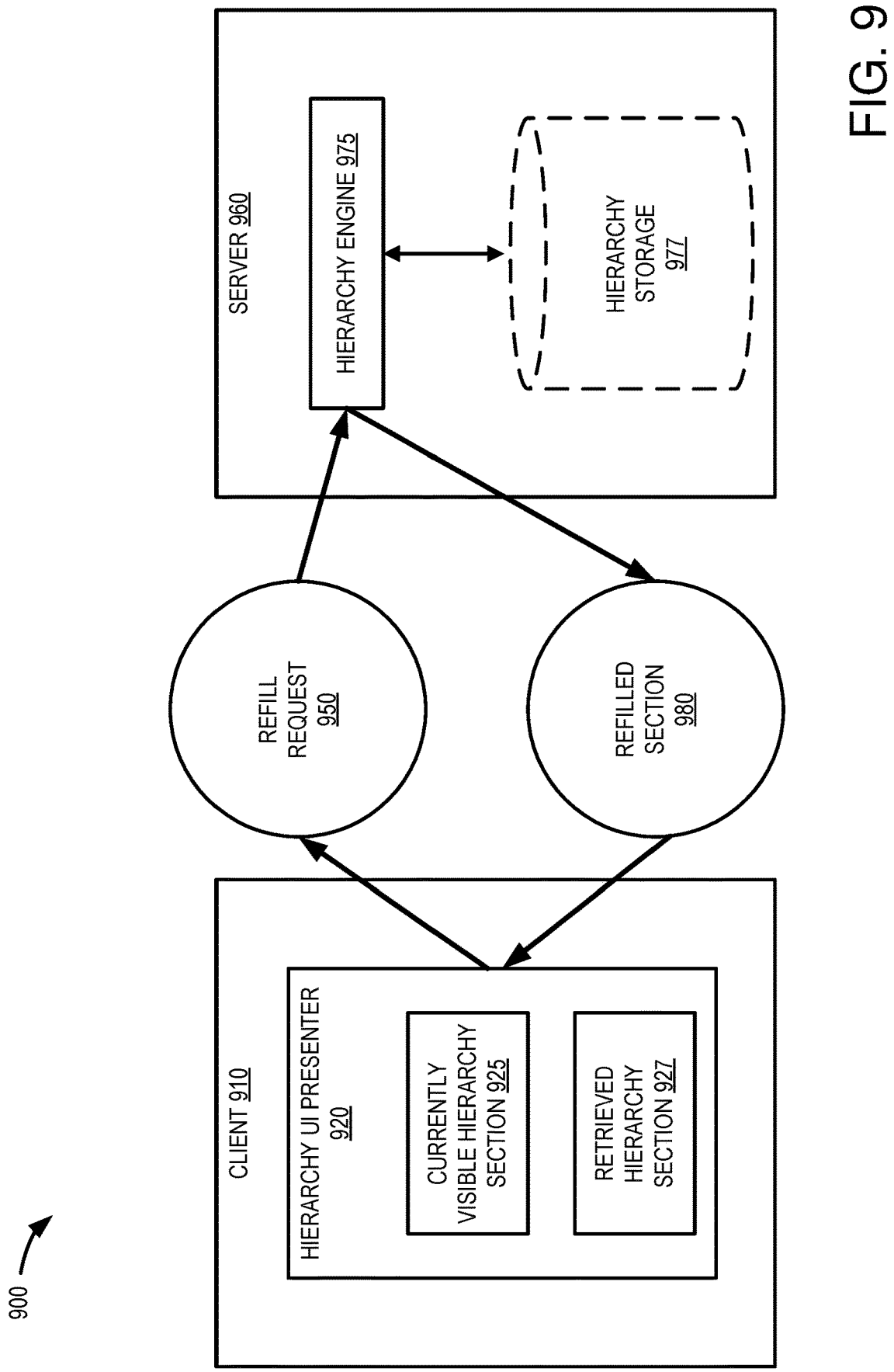
FIG. 9 is a block diagram of an example system implementing a refill request and refilled section provided in response.

FIG. 9 is a block diagram of an example system 900 implementing a refill request 950 and refilled section 980 provided in response and can be implemented in any of the examples herein. The example mimics the system 100 of FIG. 1 in that there is a client computing system 910 and a server computing system 960. The client computing system 910 comprises a hierarchy user interface presenter 920 that has an internal representation of a retrieved hierarchy section 927 and a currently visible hierarchy section 925 that is based on the retrieved hierarchy section 927.

As shown, the client 910 can send a refill request 950 to the server 960. As described herein, such a request 950 can be sent responsive to determining that a user interface activity cannot be fulfilled from the retrieved hierarchy section 927 at the client 910. Of course, a refill request 950 can also be sent when the hierarchy user interface presenter 925 is initially executed (e.g., at startup or when switching to displaying a different hierarchy).

The refill request 950 can be received by a hierarchy engine 975 that responds with a refilled section 980 based on hierarchy storage 977. The refilled section 980 can then be used by the hierarchy user interface presenter 920 as a new retrieved hierarchy section 927 (e.g., replacing the old one) that is used as a basis for the currently visible hierarchy section 925 which ultimately dictates what is displayed in the user interface.

Example 28—Example Refill Request

Figure 10:
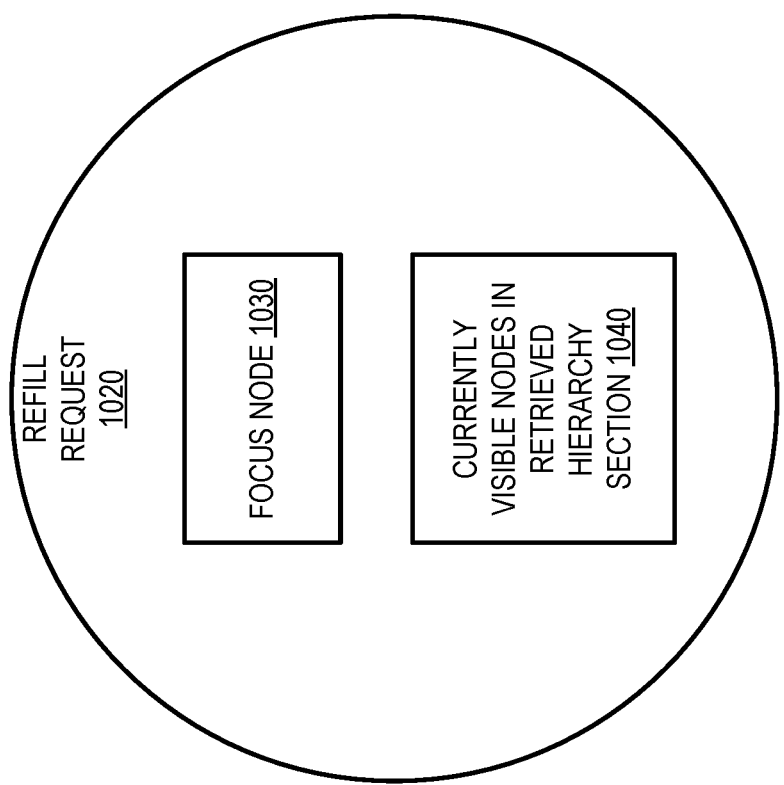
FIG. 10 is a block diagram of an example refill request.

FIG. 10 is a block diagram of an example refill request 1020 that can be used in any of the examples herein. In the example, an indication 1030 of a focus node and an indication 1040 of the currently visible nodes in the retrieved hierarchy section (which typically includes the focus node) are included in the refill request as parameters. In practice, additional parameters can be included.

Nodes can be indicated by respective node identifiers in the case of a standard hierarchy or node paths for non-standard hierarchies as described herein.

Additional parameters can include the number of nodes to be retrieved (e.g., a requested size). Such a parameter can be used to tune performance. A smaller number means less data is retrieved, but in some cases a larger number is desirable to improve some aspects of the user experience.

An indication of whether the focus node is to be expanded can also be included. The server can then expand the focus node accordingly.

An indicator for the focus node fallback (e.g., whether it is to be the following node or a preceding node from the indicated focus node) can also be included as a parameter. If the focus node is not available, the server can pick a fallback based on the indicator for the focus node fallback.

A filter can also be included as a parameter. The server can take the filter into account when fulfilling the request 1020.

Drillstate need not be explicitly specified because it can be inferred from the indication 1040 of which nodes are currently visible.

Example 29—Example System Generating Refilled Retrieved Section

The challenges of generating the retrieved section in response to a refill request can be addressed by refill systems and methods as described herein. As described herein, such a system 1100 can be incorporated into a hierarchy engine or operate in conjunction with such an engine at the server computing system.

Figure 11:
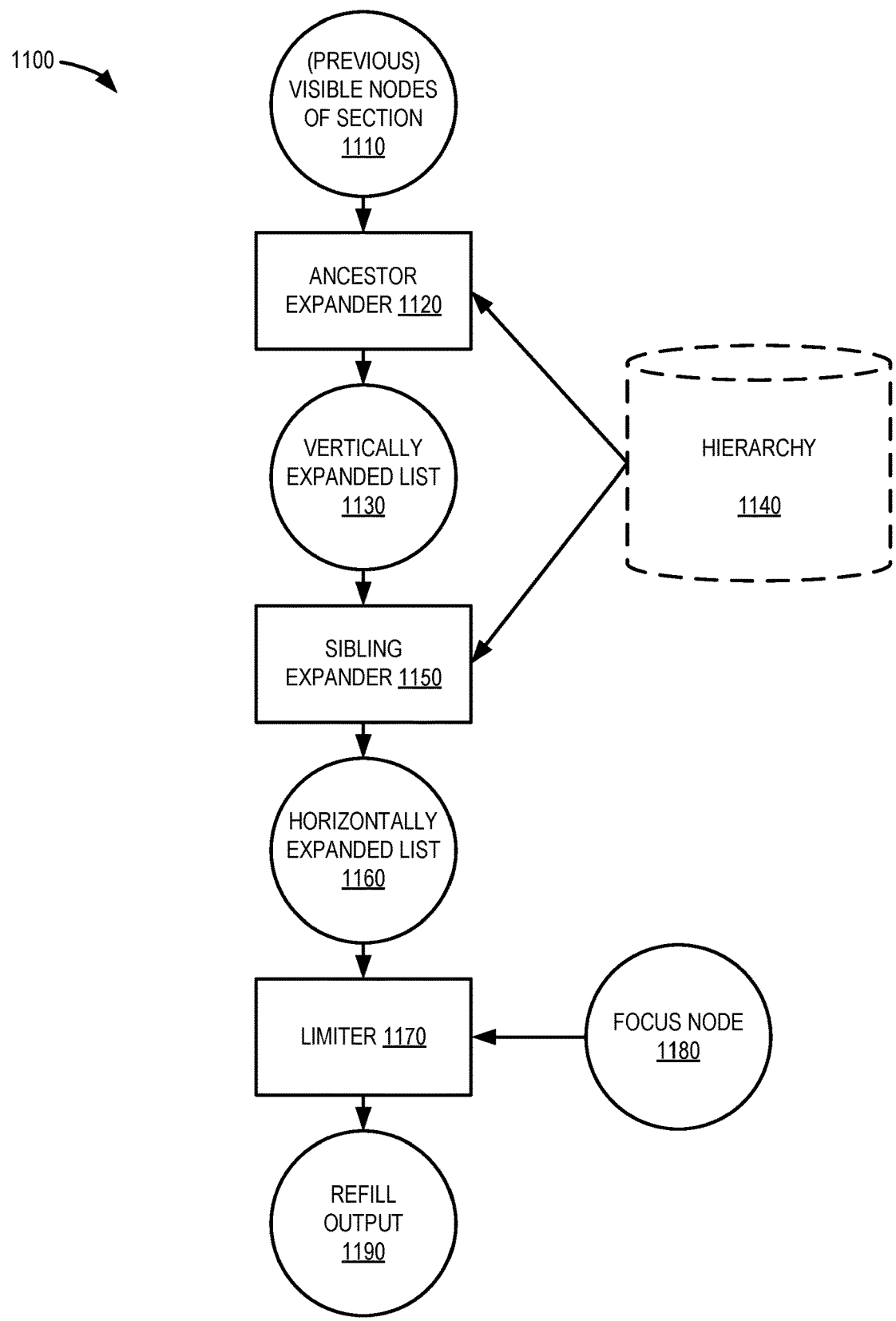
FIG. 11 is a block diagram of a system generating a refilled retrieved section of a hierarchy.

FIG. 11 is a block diagram of a system 1100 generating a refilled retrieved section of a hierarchy and can be implemented in any of the examples herein when generating a hierarchy section in response to a refill request.

An indication 1110 of the visible nodes of the retrieved hierarchy section (i.e., the visible section) can serve as input for the system 1100 and is typically provided as part of a refill request from a client as described herein.

An ancestor expander 1120 can receive the visible section 1110 and output a vertically expanded list of nodes 1130, based on the complete hierarchy 1140.

A sibling expander 1150 can received the vertically expanded list 1130 and output a horizontally expanded list 1160, based on the complete hierarchy 1140.

A limiter 1170 limits the number of nodes as described herein, based on an indication 1180 of a focus node. If the focus node is unavailable, a fallback focus node can be chosen, with some guidance from the client (e.g., provided as part of the refill request).

If the user interface activity is an expand operation, and the focus node is not a fallback, children of the focus node can be included as described herein.

Although not explicitly shown, filtering can also be performed as described herein.

Example 30—Example Method Generating Refilled Retrieved Section

Figure 12:
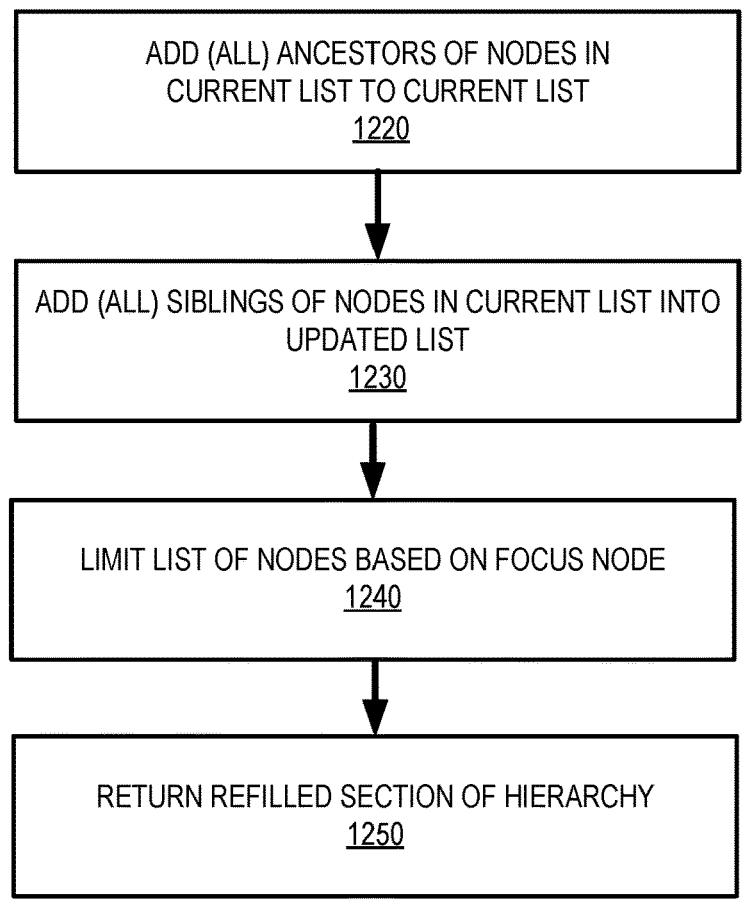
FIG. 12 is a flowchart of an example method of generating a refilled retrieved section of the hierarchy.

FIG. 12 is a flowchart of an example method 1200 of generating a refilled retrieved section of the hierarchy and can be implemented in any of the examples herein when generating a hierarchy section in response to a refill request. Such a method 1200 can be implemented by a system such as that shown in FIG. 11. As described herein, the method 1200 can be performed at a server computing system responsive to receiving a refill request from a client.

As described herein, the incoming refill request can include an indication of the nodes currently visible at the client (i.e., the visible section). Such nodes can be placed in a current list, P.

Responsive to determining that there is a filter, the list P can be reduced to those belonging in the filtered hierarchy.

Responsive to determining that P is empty, nodes associated with an initial select user interface activity can be used as a fallback set of nodes for P.

It can also be determined whether the focus node specified in the refill request is missing. Responsive to determining that the focus node is missing in the reduced list P, a fallback focus node can be chosen. In practice, the incoming refill request can specify whether a following or preceding node is to be selected, and the node following or preceding where the missing focus node was (e.g., before it went missing, based on an ordering of the focus node) can be selected as the fallback.

At 1220, ancestor nodes of any nodes in the current list P can be added to the current list P, resulting in a vertically expanded list.

At 1230, the current list P and siblings of nodes in the current list P within the hierarchy (after applying a filter, if any) are placed in an updated list S.

As described herein, a fallback focus node can provide a smoother user experience when the focus node is no longer available (e.g., a filter was applied that excluded the focus node, another user working simultaneously on the hierarchy removed it, or the like). A basic strategy is to choose a fallback node that is in the list of currently visible nodes (e.g., which can include previously visible nodes as described herein) (e.g., the input list 1220). The fallback node can be contained in the updated list of 1230. An indication of whether a preceding or following node of the focus node can be provided, depending on the user interface activity (e.g., default is preceding node). If none of the currently visible nodes (e.g., including previously visible nodes as described herein) are available, the system can revert to the first node of the hierarchy as a fallback.

At 1240, the updated list S is limited to the required number of nodes before and after the focus node, and it is ordered by the standard hierarchy order. The size parameter of the refill request can control the number of nodes.

In the case of a user interface activity "expand," and if the focus node is not a fallback, the children of the focus node (in the filtered hierarchy) can be included into the ordered and limited list S.

The drillstate of the nodes in the updated list S can be determined (e.g., based on which nodes were visible at the client) and indicated in the updated list S. In this way, drillstate is preserved.

At 1250, the updated list S is returned as the refilled section of the hierarchy.

A dedicated hierarchy engine can execute such a process efficiently.

The list S resulting from the method 1200 is a proper hierarchy section of the filtered hierarchy as described herein.

Example 31—Example Extension of Technologies

The technologies are not limited to the described examples. The technologies described herein can be extended to other user interface activities such as navigation to the parent node or expansion of a complete subtree (e.g., expand all) by choosing appropriate parameters or extending the server operation while ensuring that the retrieved set of nodes is still a proper hierarchy section.

Further visibility strategies for new or described user interface activities can be implemented at the client, based on the retrieved hierarchy section.

Example 32—Example Implementation of Technologies

FIG. 13 is a block diagram showing a starting situation 1300 of a visual section of a hierarchy in which several nodes are expanded and is used as a starting situation. The node text and visualization of the hierarchy is shown at left, and the depth, level, node id, parent node id, and tree size characteristics are shown at right.

Responsive to receiving a user interface activity of expanding "inner node 13," a refill request is sent, and the response includes the children of node 13. The server also updates the visible section with any changes that happened on the server (e.g., due to edits by others), while keeping the original layout.

FIG. 14 is a block diagram 1400 showing the updated visual section of the hierarchy in which inner node 13 is expanded. In the example, the node "master data 5" was moved from parent node 8 to parent node 3 (e.g., by another user). Thus, the response to the refill request from the client reflects that movement of "master data 5" and shows it in the new position 1420 as shown.

FIG. 15 is a block diagram showing a starting situation 1500 of a visual section of a hierarchy in a format similar to that of FIG. 13. In the example, the client keeps a limited set of data, so reasonable behavior is implemented if the user's actions result in exceeding the limit. The example uses a limit of 40 rows, but in practice many more rows can be used.

All nodes are shown as expanded. Responsive to receiving a user interface activity of scrolling one page down, the situation changes to that shown in 1600 of FIG. 16. The last line of the previous page is shown on the new page. The user interface can be implemented to choose other scrolling actions. The new page shows only six (6) entries because it reaches the end of the hierarchy. The not-yet-expanded nodes are shown in a collapsed state.

Responsive to a user interface activity of expand node performed on "inner node 23," the situation 1700 of FIG. 17 results.

Whether or not a refill request is sent can depend on the buffer size and previous user interface activities. For example, is a refill request is performed in the example, it need only retrieve additional subnodes while keeping the user interface stable.

Responsive to receiving a user interface activity of scroll up (a page), the client can preserve drillstate for those nodes already present locally. The client and server can thus work together to preserve the drillstate. For example, in the example, "master data 12" is present locally at the client and can be sent as part of the currently visible hierarchy to let the server know that its parent node is expanded (e.g., to preserve drillstate).

In the example, "master data 14" is the focus node and will become the last line after scrolling up one page. The focus node can be chosen to be visible both before and after updating the user interface. The fallback node can also be chosen by the same criteria. Such an arrangement results in a smoother user experience due to the continuity of the user interface.

As described herein, some nodes that are not currently displayed can be included in the currently visible nodes. In the example, "master data 12" can be added to the list of currently visible nodes. For example, after receiving the "scroll up" user interface activity, the user interface presenter first tries to determine a new set of visible nodes form the client buffer (e.g., the retrieved hierarchy section that is stored locally). In the example, not enough nodes are available in the buffer to fill a complete page, so a refill from the server is needed. Because the user wants to see the scrolled-up page, in this case, the request is made with a set of currently visible nodes that includes those nodes that would be visible from the client in case of a scroll up (e.g., to the extent possible, locally stored nodes are included).

Such an approach offers a better user experience: the visibility (drillstate) from a previous drill-down action is preserved, providing better user interface continuity to the user. Otherwise, the user would need to re-expand a node to restore it to its prior displayed state. So, a refill request can include nodes that will be visible as part of the currently visible nodes, even if such nodes are not actually currently being displayed, as described herein.

Responsive to detecting that the node is present in the refill request, the server can set the drillstate of the parent to be "expanded." Thus, its siblings (master data nodes 9-11) will also be shown along with its ancestors (inner nodes 13, 2, and 1) and their siblings (inner nodes 3 and 8) as seen in FIG. 18. Responsive to determining that there is sufficient space in the display window, they are all shown.

It should be noted that inner node 3 is not shown as expanded, even though the user had expended it before. A user may be disappointed because the drillstate is not preserved. This is not a limitation of the technology, but rather the size parameter of the refill request. In practice, a larger value (e.g., 100) would have resulted in a better user experience. The parameter can thus be set and tuned as appropriate and may be different for different hierarchy types or sizes.

Example 33—Example Advantages

Several example advantages can be achieved via the technologies described herein.

In a tiered cloud environment involving a client and server, only a limited number of nodes are transferred back and forth between the client and the server, so it can function well if there is a limited network bandwidth communication channel between the client and the server. Because the main work can be done by a single call to the server, the technology can work even if there is high latency for a communication roundtrip. The described technology does not require a common state, so it can work over a stateless communication protocol, such as those used by web browsers. The technologies are robust against changes, so they support environments where there is simultaneous display and change of a hierarchy by multiple users.

Challenges related to hierarchies are overcome. For example, the user can drill into a hierarchy and not only scroll linearly as in a simple list. Drillstates are properly maintained. Even big hierarchies with millions of nodes can be supported by leveraging the hierarchy engine on the server. Even non-standard hierarchies with multiple parents of a node or with cycles can be covered by identifying nodes by their path to a root node.

The user experience achieved by the technologies can support multiple advantages: drilling into the hierarchy and freely expanding or collapsing nodes to display their children; scrolling through the (expanded) nodes; defining filters to identify nodes with certain characteristics and show them in the hierarchy context; the context between interactions is not lost; displayed nodes and their drillstate are kept (fallbacks for special cases are available); and a consistent and updated hierarchy is shown even in case of changes by another user.

Other advantages are possible.

Example 34—Example Proper Hierarchy Section Discussion

As described herein, generation of a proper hierarchy section can be used to advantage when generating a refilled section; such a technique can result in expected behavior in the user interface while preserving acceptable or superior performance within the user interface.

For purposes of explanation, one can number nodes of a hierarchy consecutively by starting at the first root node according to the hierarchy's sibling's order and traversing the descendant nodes in a depth-first sequence while again respecting the siblings' order. After finishing descendants of the first root node, the numbering can continue with the next root nodes in the same way. The number thus assigned to a hierarchy node is called the "preorder rank" of the node.

A subset of nodes of a hierarchy, ordered by the preorder rank, is called a "drilled sequence" of the hierarchy, if and only if:
  The subset contains all sibling nodes of a node in the subset (the root nodes are considered as a set of sibling nodes, too in multiple root scenarios); and
  The subset contains all ancestor nodes of a node in the subset.

A formal, proper hierarchy section is a consecutive subsequence of a drilled sequence. Such a formal, proper hierarchy section can be used as a proper hierarchy section as described herein, resulting in the noted benefits.

The preorder rank can be a fundamental means for handling hierarchies and typically provided by standard hierarchy engines, so such functionality can be leveraged when displaying large hierarchies as described herein.

The root nodes of a hierarchy, sorted by the preorder rank, form a drilled sequence.

Any non-empty drilled sequence includes the root nodes of the hierarchy.

Given a drilled sequence, the following operations lead to a new drilled sequence:

Expansion of a node of a drilled sequence: The children of the expanded node are added to the drilled sequence at positions defined by their preorder rank. The conditions for a drilled sequence are also valid for the new sorted set of nodes.

Collapse of a node of a drilled sequence: The descendant nodes of the collapsed node are removed from the drilled sequence. The conditions for a drilled sequence are also valid for the new sorted set of nodes.

On the other hand, for proof purposes, a claim can be made that every non-empty drilled sequence can be created starting from the set of root nodes by expanding nodes.

The proof for the claim is made by induction on the size of drilled sequences. Given a drilled sequence S, take any node n of the sequence that has no children within the drilled sequence, and which is not a root node. If no such node exists, the drilled sequence is just the set of nodes, the starting point.

If a node n exists, also its parent node p belongs to S. Now, define a new set of nodes T by removing node n and all its siblings from S. T again is a drilled sequence as it fulfills the defining conditions. T contains node p, so S can be created from T by expanding node p. As T is smaller than S, the proof is completed.

The meaning of drilled sequences and proper hierarchy sections in a user interface can thus be better understood. By expanding nodes, the user actually works with drilled sequences of a hierarchy when displaying the hierarchy. A user interface cannot display all elements of a drilled sequence if the drilled sequences is too big, so it only displays a hierarchy section, which a user can adjust by scrolling up or down. In this way, the correctness of the nodes displayed in the user interface can be preserved in light of limited screen real estate, which also results in acceptable performance in that the number of nodes communicated between the server and the client are limited. As described herein, additional nodes can be included along for the ride so that some user interface activities can be performed relying on local nodes in the retrieved hierarchy that are not yet visible.

Example 35—Example Computing Systems

Figure 19:
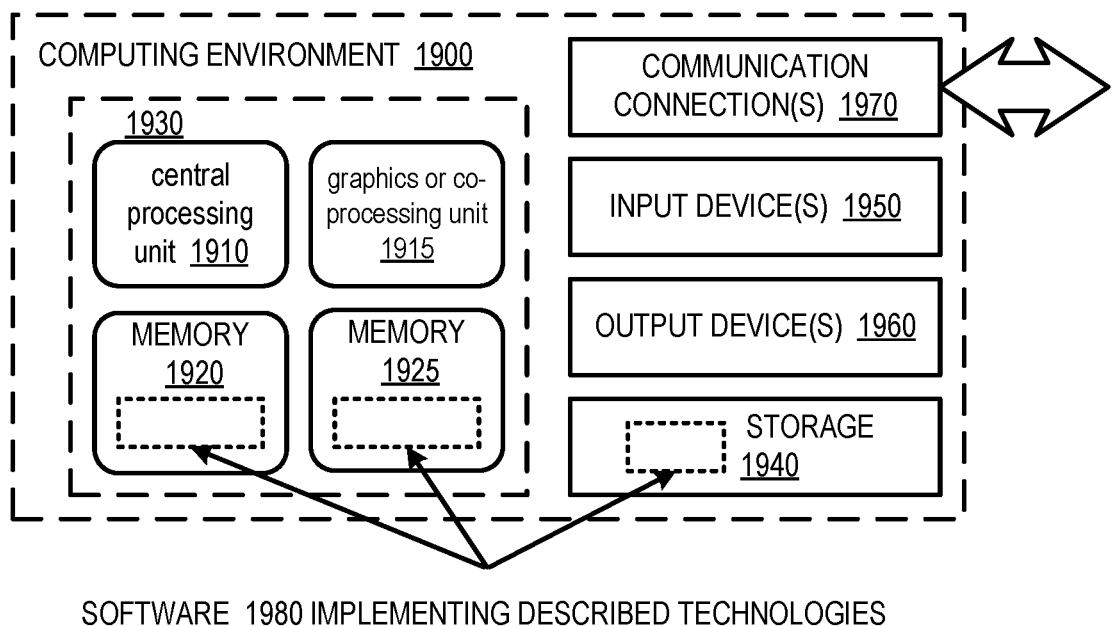
FIG. 19 is a block diagram of an example computing system in which described embodiments can be implemented.

FIG. 19 depicts an example of a suitable computing system 1900 in which the described innovations can be implemented. The computing system 1900 is not intended to suggest any limitation as to scope of use or functionality of the present disclosure, as the innovations can be implemented in diverse computing systems.

With reference to FIG. 19, the computing system 1900 includes one or more processing units 1910, 1915 and memory 1920, 1925. In FIG. 19, this basic configuration 1930 is included within a dashed line. The processing units 1910, 1915 execute computer-executable instructions, such as for implementing the features described in the examples herein. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 can be volatile memory (e.g., registers, cache, RAM), non-volatile memory (e.g., ROM, EEPROM, flash memory, etc.), or some combination of the two, accessible by the processing unit(s) 1910, 1915. The memory 1920, 1925 stores software 1980 implementing one or more innovations described herein, in the form of computer-executable instructions suitable for execution by the processing unit(s) 1910, 1915.

A computing system 1900 can have additional features. For example, the computing system 1900 can include storage 1940, one or more input devices 1950, one or more output devices 1960, and one or more communication connections 1970, including input devices, output devices, and communication connections for interacting with a user. An interconnection mechanism (not shown) such as a bus, controller, or network interconnects the components of the computing system 1900. Typically, operating system software (not shown) provides an operating environment for other software executing in the computing system 1900, and coordinates activities of the components of the computing system 1900.

The tangible storage 1940 can be removable or non-removable, and includes magnetic disks, magnetic tapes or cassettes, CD-ROMs, DVDs, or any other medium which can be used to store information in a non-transitory way and which can be accessed within the computing system 1900. The storage 1940 stores instructions for the software 1980 implementing one or more innovations described herein.

The input device(s) 1950 can be an input device such as a keyboard, mouse, pen, or trackball, a voice input device, a scanning device, touch device (e.g., touchpad, display, or the like) or another device that provides input to the computing system 1900. The output device(s) 1960 can be a display, printer, speaker, CD-writer, or another device that provides output from the computing system 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Example 36—Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Example 37—Example Cloud Computing Environment

Figure 20:
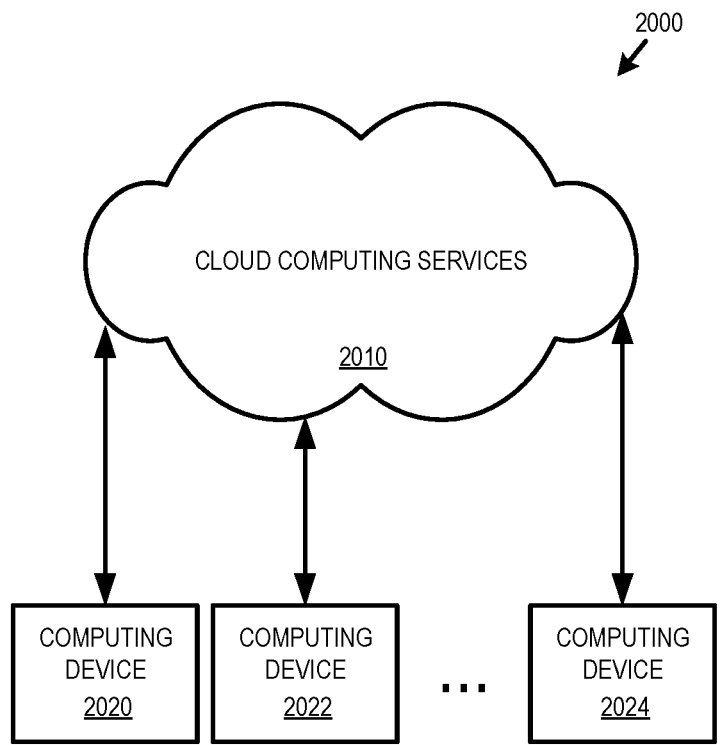
FIG. 20 is a block diagram of an example cloud computing environment that can be used in conjunction with the technologies described herein.

FIG. 20 depicts an example cloud computing environment 2000 in which the described technologies can be implemented, including, e.g., the system 100 of FIG. 1 and other systems herein. The cloud computing environment 2000 comprises cloud computing services 2010. The cloud computing services 2010 can comprise various types of cloud computing resources, such as computer servers, data storage repositories, networking resources, etc. The cloud computing services 2010 can be centrally located (e.g., provided by a data center of a business or organization) or distributed (e.g., provided by various computing resources located at different locations, such as different data centers and/or located in different cities or countries).

The cloud computing services 2010 are utilized by various types of computing devices (e.g., client computing devices), such as computing devices 2020, 2022, and 2024. For example, the computing devices (e.g., 2020, 2022, and 2024) can be computers (e.g., desktop or laptop computers), mobile devices (e.g., tablet computers or smart phones), or other types of computing devices. For example, the computing devices (e.g., 2020, 2022, and 2024) can utilize the cloud computing services 2010 to perform computing operations (e.g., data processing, data storage, and the like).

In practice, cloud-based, on-premises-based, or hybrid scenarios can be supported.

Example 38—Example Implementations

Although the operations of some of the disclosed methods are described in a particular, sequential order for convenient presentation, such manner of description encompasses rearrangement, unless a particular ordering is required by specific language set forth herein. For example, operations described sequentially can in some cases be rearranged or performed concurrently.

Example 39—Example Embodiments

Any of the following embodiments can be implemented.

Clause 1. A computer-implemented method comprising:
presenting a user interface comprising a visual depiction of currently visible nodes of a retrieved section of a hierarchy comprising a plurality of nodes;
receiving an indication of a user interface activity on the hierarchy via the user interface;
sending a refill request to a server computing system, wherein the refill request comprises an indication of the currently visible nodes of the retrieved section of the hierarchy; and
receiving from the server computing system, a refilled section replacing the retrieved section of the hierarchy.

Clause 2. One or more non-transitory computer-readable media comprising computer-executable instructions that, when executed, cause a computing system to perform the method of Clause 1.

Clause 3. The method of Clause 1 further comprising:
choosing a focus node of the hierarchy;
wherein the refill request comprises an indication of the focus node; and
wherein generation of the refilled section replacing the retrieved section of the hierarchy is based on the focus node.

Clause 4. The method of any one of Clauses 1 and 3 further comprising:
choosing a focus node of the hierarchy;
wherein the refill request comprises an indication of the focus node; and
wherein generation of the refilled section replacing the retrieved section of the hierarchy is based on a fallback focus node other than the focus node.

Clause 5. The method of any one of Clauses 1 and 3-4 wherein:
the refilled section replacing the retrieved section of the hierarchy reflects having performed the user interface activity on the hierarchy; and
the method further comprises:
updating the user interface, wherein the updating reflects having performed the user interface activity on the hierarchy based on the refilled section replacing the retrieved section of the hierarchy.

Clause 6. The method of Clause 5 wherein the visual depiction of the hierarchy reflects a drillstate of the hierarchy; and
the drillstate is preserved after updating the user interface.

Clause 7. The method of any of Clauses 5-6 wherein:
the user interface activity is selected from the group consisting of scroll up, scroll down, node collapse, and node expand.

Clause 8. The method of any one of Clauses 1 and 3-7 further comprising:
including an indication of at least one node not currently displayed at a client as a currently visible node.

Clause 9. The method of Clause 8 wherein:
the user interface activity comprises a scroll up activity;
the at least one node not currently displayed is a child node of a parent node that was previously expanded in the user interface; and
including the indication of the at least one node not currently displayed at the client as a currently visible preserves drillstate of the at least one node not currently displayed.

Clause 10. The method of any one of Clauses 1 and 3-9 wherein:

the refilled section replacing the retrieved section the hierarchy is a proper section of the hierarchy.

Clause 11. The method of Clause 10 wherein:

the refill request comprises a requested size; and the refilled section replacing the retrieved section is limited to the requested size.

Clause 12. The method of any one of Clauses 1 and 3-11 wherein the sending is performed responsive to receiving the user interface activity.

Clause 13. The method of any one of Clauses 1 and 3-12 wherein:

the user interface is presented at a first client computing system for editing; and the hierarchy is concurrently presented at a second client computing system for editing.

Clause 14. The method of any one of Clauses 1 and 3-13 wherein:

the refill request comprises a filter applied to the hierarchy; and the refilled section replacing the retrieved section of the hierarchy reflects the filter.

Clause 15. The method of any one of Clauses 1 and 3-14 further comprising:

at a client computing system, determining whether the user interface activity can be processed locally at the client computing system;

wherein sending the refill request to the server computing system is performed responsive to determining that the user interface activity cannot be processed locally at the client computing system.

Clause 16. A computing system comprising:

one or more processors;

a hierarchy comprising a plurality of nodes stored in one or more computer-readable media; and memory configured to cause the one or more processors to perform operations comprising:

receive a refill request from a client computing system to refill a currently visible section of the hierarchy, wherein the refill request comprises an indication of the currently visible section of the hierarchy;

responsive to the refill request, determining a refilled section of the hierarchy; and sending the refilled section to the client computing system.

Clause 17. The computing system of Clause 16 wherein:

the refill request comprises an indication of a focus node of the stored hierarchy and an indication of how to choose a fallback focus node; and the method further comprises:

determining that the focus node is missing; and responsive to determining that the focus node is missing, choosing a fallback focus node based on the indication of how to choose the fallback focus node;

wherein determining the refilled section of the hierarchy is based on the fallback focus node.

Clause 18. The computing system of Clause 17 wherein:

determining a refilled section of the hierarchy comprises:

based on nodes in the currently visible section of the hierarchy, adding ancestors in the hierarchy of nodes in the section, yielding a provisional set of nodes;

generating a list of nodes comprising the provisional set of nodes and any siblings of any nodes in the provisional set of nodes; and limiting the provisional set of nodes based on a focus node.

Clause 19. The computing system of any one of Clauses 16-18 wherein:

the refill request comprises an indication of a focus node of the stored hierarchy;

the method further comprises responsive to determining that the focus node is unavailable, choosing a fallback focus node of the stored hierarchy; and determining a refilled section of the hierarchy is based on the indication of the focus node.

Clause 20. One or more non-transitory computer-readable media comprising computer-executable instructions that, when executed, cause a computing system to perform a method comprising:

receiving a refill request from a client computing system to refill a retrieved section of a hierarchy, wherein the hierarchy is stored at a server computing system, wherein a proper section of the hierarchy is currently visible at the client computing system in a user interface at the client computing system, wherein the refill request comprises an indication of the currently visible nodes of the hierarchy and an indication of a focus node;

responsive to the refill request, determining a refilled section, wherein the refilled section is a proper hierarchy section and determining the refilled section comprises (a)-(c):

(a) based on the currently visible nodes of the hierarchy, adding ancestors in the hierarchy of nodes in the refilled section, yielding a provisional set of nodes;

(b) generating a list of nodes comprising the provisional set of nodes and any siblings of any nodes in the provisional set of nodes; and (c) limiting the provisional set of nodes based on the focus node; and sending the refilled section to the client computing system.

Clause 21. One or more non-transitory computer-readable media comprising computer-executable instructions that, when executed, cause a computing system to perform the method of any one of Clauses 3-15.

Example 40—Example Alternatives

The technologies from any example can be combined with the technologies described in any one or more of the other examples. In view of the many possible embodiments to which the principles of the disclosed technology can be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computer-implemented method comprising:

presenting, by a first client computing system, a user interface comprising a visual depiction of currently visible nodes of a retrieved section of a hierarchy comprising a plurality of nodes;

receiving, by the first client computing system, an indication of a user interface activity on the hierarchy via the user interface;

choosing, by the first client computing system, a focus node for retrieval of a refilled section of the hierarchy based on the indication of the user interface activity;

responsive to the indication of the user interface activity, sending a refill request to a server computing system, wherein the refill request comprises an indication of the currently visible nodes of the retrieved section of the hierarchy and the focus node, wherein the indication of the currently visible nodes of the retrieved section of the hierarchy comprises a drillstate of the currently visible nodes;

receiving, by the first client computing system from the server computing system, the refilled section of the hierarchy, wherein the refilled section of the hierarchy comprises a subset of nodes of the hierarchy reconstructed at the server computing system with the drillstate of the currently visible nodes; and updating the user interface with the refilled section of the hierarchy, wherein the refilled section of the hierarchy replaces the retrieved section of the hierarchy.

2. The method of claim 1 wherein the subset of nodes is selected around the focus node.

3. The method of claim 1 further comprising:
determining, at the server computing system, that the focus node is missing; and
determining, at the server computing system, a fallback focus node other than the focus node for fulfilling the refill request;
wherein the subset of nodes is selected around the fallback focus node.

4. The method of claim 1 wherein:
updating the user interface comprises reflecting having performed the user interface activity on the hierarchy.

5. The method of claim 4 wherein:
the user interface activity is selected from the group consisting of scroll up, scroll down, node collapse, and node expand.

6. The method of claim 5 further comprising:
including at least one node of the retrieved section not currently displayed on the user interface in a list of currently visible nodes.

7. The method of claim 6 wherein:
the user interface activity comprises a scroll up activity;
the at least one node of the retrieved section not currently displayed on the user interface is a child node of a parent node that was previously expanded in the user interface; and
including the at least one node of the retrieved section not currently displayed on the user interface in the list of currently visible nodes preserves a drillstate of the at least one node of the retrieved section not currently displayed on the user interface.

8. The method of claim 5 wherein:
the refill request further comprises a requested size; and
the refilled section replacing the retrieved section is limited to the requested size.

9. The method of claim 1 wherein the sending is performed responsive to receiving the user interface activity.

10. The method of claim 1 wherein:
the user interface is presented at the first client computing system for editing the hierarchy; and
the hierarchy is concurrently presented at a second client computing system for editing the same hierarchy.

11. The method of claim 1 wherein:
the refill request comprises a filter applied to the hierarchy; and
the refilled section replacing the retrieved section of the hierarchy reflects the filter.

12. The method of claim 1 further comprising:
at the first client computing system, determining whether the user interface activity can be processed locally at the first client computing system;
wherein sending the refill request to the server computing system is performed responsive to determining that the user interface activity cannot be processed locally at the first client computing system.

13. A computing system comprising:
one or more processors;
a hierarchy comprising a plurality of nodes stored in one or more computer-readable media; and
memory configured to cause the one or more processors to perform operations comprising:
receiving a refill request from a client computing system to refill a currently visible section of the hierarchy, wherein the refill request comprises an indication of the currently visible section of the hierarchy and a focus node for retrieval of a refilled section of the hierarchy based on a user interface activity on the client computing system, wherein the indication of the currently visible section of the hierarchy comprises a drillstate of the currently visible section;
responsive to the refill request, determining the refilled section of the hierarchy, wherein the refilled section determined comprises a subset of nodes of the hierarchy reconstructed with the drillstate of the currently visible section; and
sending the refilled section to the client computing system.

14. The computing system of claim 13 wherein:
the refill request further comprises an indication of how to choose a fallback focus node if the focus node is missing from the stored hierarchy; and
the operations further comprise:
determining that the focus node is missing; and
responsive to determining that the focus node is missing, choosing a fallback focus node based on the indication of how to choose the fallback focus node;
wherein determining the refilled section of the hierarchy is based on the fallback focus node.

15. The computing system of claim 13 wherein:
determining the refilled section of the hierarchy comprises:
generating a provisional set of nodes based on nodes in the currently visible section of the hierarchy, and ancestors of the nodes in the currently visible section of the hierarchy;
generating a list of nodes comprising the provisional set of nodes and any siblings of any nodes in the provisional set of nodes;
limiting the set list of nodes based on the focus node; and
generating the refilled section from the list of nodes limited based on the focus node and with the drillstate of the currently visible section of the hierarchy.

16. The computing system of claim 13 wherein:
the operations further comprise responsive to determining that the focus node is unavailable, choosing a fallback focus node from the stored hierarchy; and
determining the refilled section of the hierarchy based on the fallback focus node.

17. One or more non-transitory computer-readable media comprising computer-executable instructions that, when executed, cause a server computing system to perform a method comprising:
receiving a refill request to refill a retrieved section of a hierarchy from a client computer system, wherein the hierarchy is stored at the server computing system, wherein a proper section of the hierarchy is currently visible in a user interface at the client computing system, wherein the refill request comprises an indication of the currently visible nodes of the hierarchy and an indication of a focus node based on a user interface activity, wherein the indication of the currently visible nodes of the retrieved section of the hierarchy comprises a drillstate of the currently visible nodes;

responsive to the refill request, determining a refilled section, wherein the refilled section is a proper hierarchy section and determining the refilled section comprises (a)-(d):
  (a) generating a provisional set of nodes based on the currently visible nodes of the hierarchy, and ancestors of the currently visible nodes of the hierarchy;
  (b) generating a list of nodes comprising the provisional set of nodes and any siblings of any nodes in the provisional set of nodes; and
  (c) limiting the list of nodes based on the focus node; and
  (d) generating the refilled section from the list of nodes limited based on the focus node and with the drillstate of the currently visible nodes; and sending the refilled section to the client computing system.

* * * * *